(12) United States Patent
Takenaka et al.

(10) Patent No.: US 7,143,850 B2
(45) Date of Patent: Dec. 5, 2006

(54) LEG JOINT ASSIST DEVICE FOR LEGGED MOVABLE ROBOT

(75) Inventors: Toru Takenaka, Wako (JP); Hiroshi Gomi, Wako (JP); Kazushi Hamaya, Wako (JP); Yoshinari Takemura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 30 days.

(21) Appl. No.: 10/494,846

(22) PCT Filed: Oct. 7, 2002

(86) PCT No.: PCT/JP02/10418

§ 371 (c)(1),
(2), (4) Date: May 6, 2004

(87) PCT Pub. No.: WO03/039819

PCT Pub. Date: May 15, 2003

(65) Prior Publication Data

US 2004/0261561 A1    Dec. 30, 2004

(30) Foreign Application Priority Data

Nov. 9, 2001    (JP) ............................. 2001-345428

(51) Int. Cl.
*B62D 51/06* (2006.01)

(52) U.S. Cl. ..................... 180/8.6; 180/8.5; 180/8.1; 180/8.2; 180/8.3

(58) Field of Classification Search ............... 180/8.5, 180/8.6, 8.3
See application file for complete search history.

(56) References Cited

U.S. PATENT DOCUMENTS

| | | | | |
|---|---|---|---|---|
| 4,738,583 A | * | 4/1988 | Macconochie et al. | ..... 414/735 |
| 4,834,200 A | * | 5/1989 | Kajita | ........................ 180/8.1 |
| 4,977,971 A | * | 12/1990 | Crane et al. | .................. 180/8.3 |
| 5,159,988 A | * | 11/1992 | Gomi et al. | .................. 180/8.6 |
| 5,351,773 A | * | 10/1994 | Yanagisawa | ................. 180/8.5 |
| 5,842,533 A | * | 12/1998 | Takeuchi | .................... 180/8.1 |
| 6,112,843 A | * | 9/2000 | Wilcox et al. | .............. 180/345 |
| 6,193,002 B1 | * | 2/2001 | Paakkunainen | ............. 180/8.1 |

FOREIGN PATENT DOCUMENTS

| | | |
|---|---|---|
| JP | 05-329792 | 12/1993 |
| JP | 11-300660 | 11/1999 |
| JP | 2001-198864 | 7/2001 |
| JP | 2001-287177 | 10/2001 |
| JP | 2002-219683 | 8/2002 |

* cited by examiner

*Primary Examiner*—Lesley D. Morris
*Assistant Examiner*—Marlon Arce-Diaz
(74) *Attorney, Agent, or Firm*—Rankin, Hill, Porter & Clark LLP

(57) ABSTRACT

An assist device is provided with a spring device that generates an auxiliary driving force, by an elastic energy, acting on a joint of a leg. The spring device includes a gas spring having a cylinder and a piston. Bending/stretching motion between link members and at the joint is transmitted to the spring device through a motion transmission device that includes a link arm. The spring device is provided so that the auxiliary driving force increases as a knee bending angle $\theta$ increases until the knee bending angle $\theta$ reaches a predetermined angle, and so that, once the knee bending angle $\theta$ exceeds the predetermined angle, the auxiliary driving force becomes smaller than or equal to the driving force obtaining at the predetermined angle, effectively reducing a burden on an actuator of the legged mobile robot joint.

13 Claims, 14 Drawing Sheets

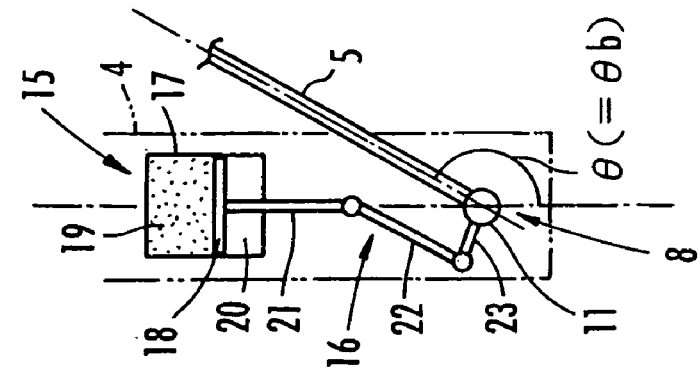
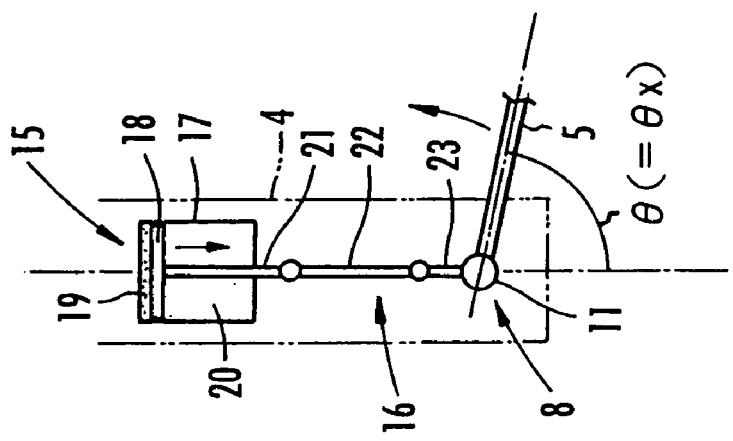
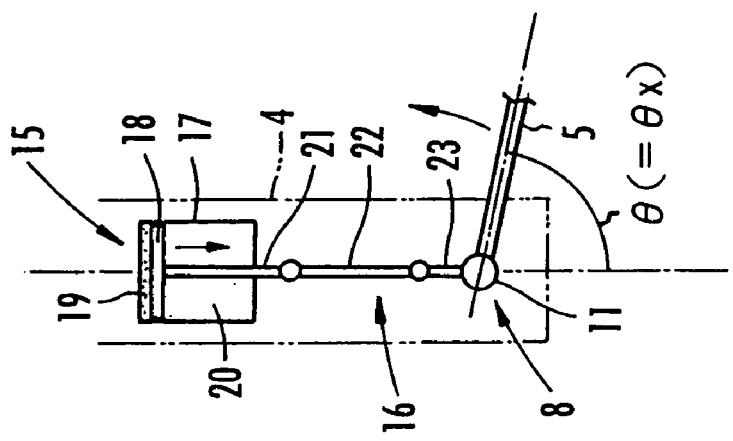
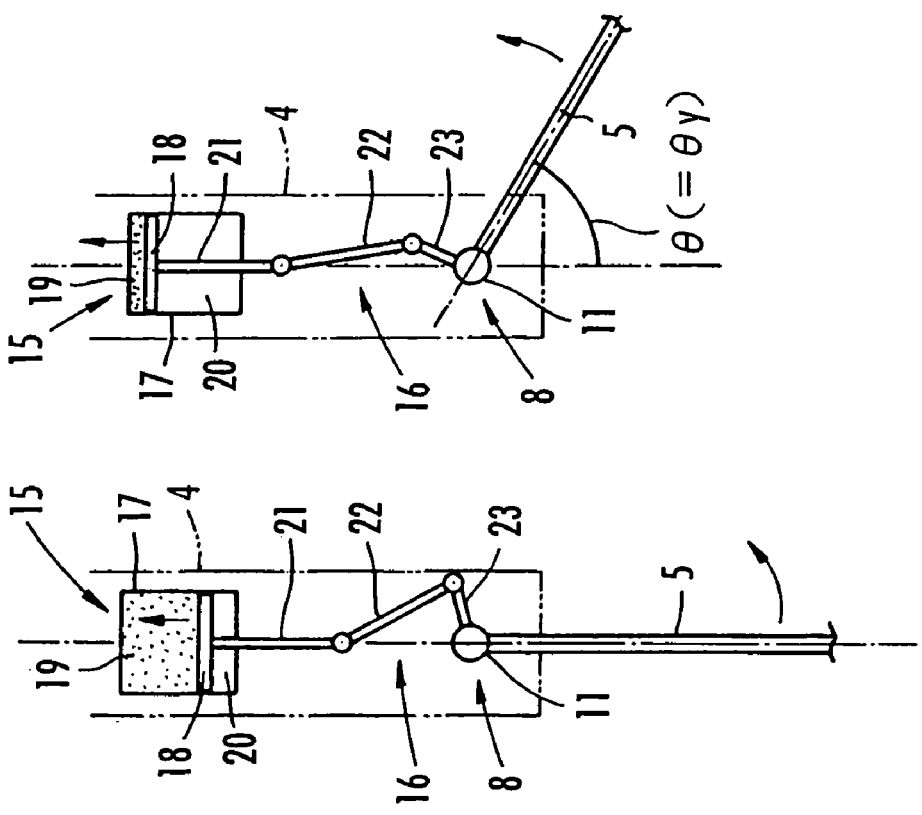

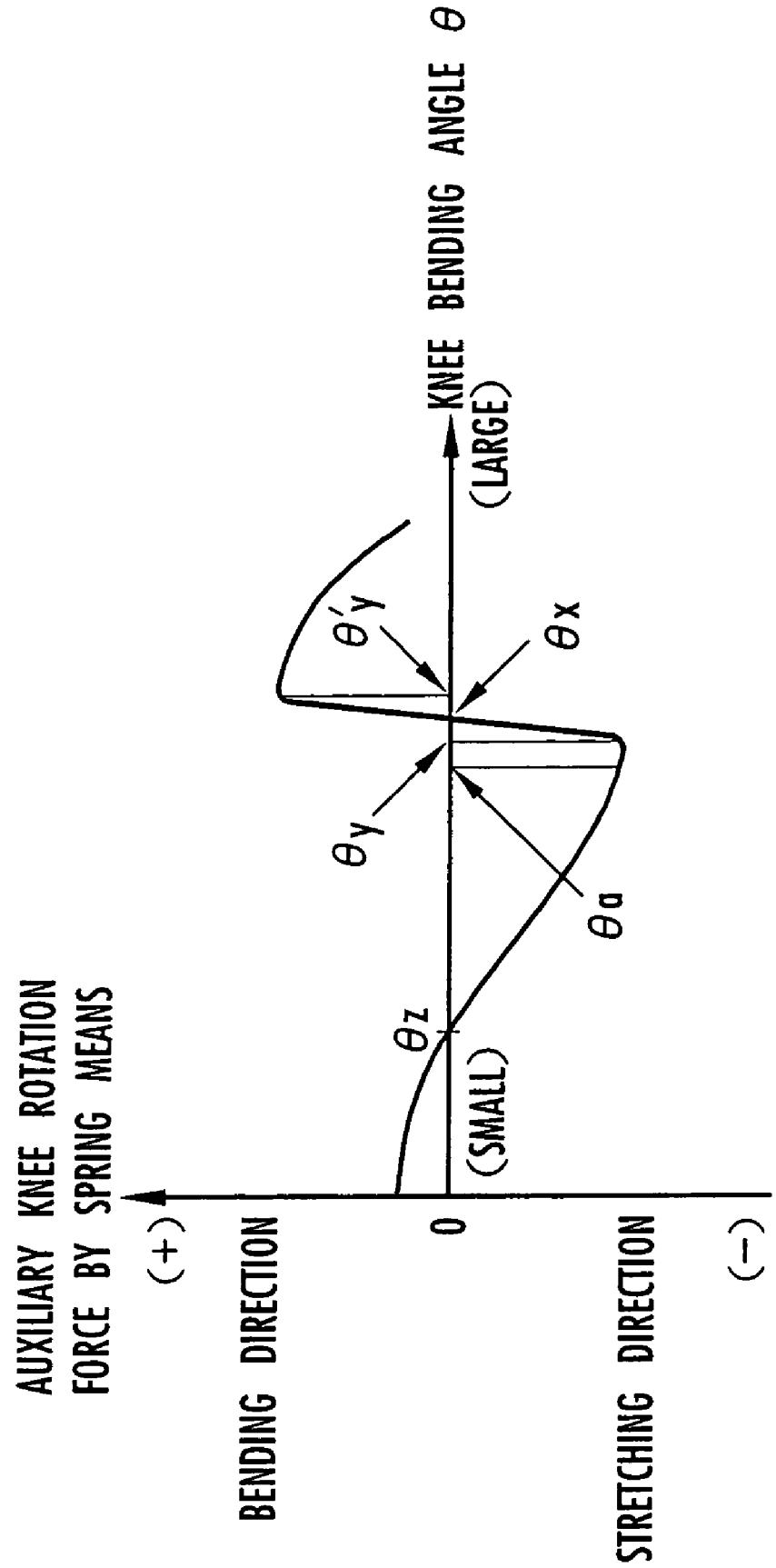

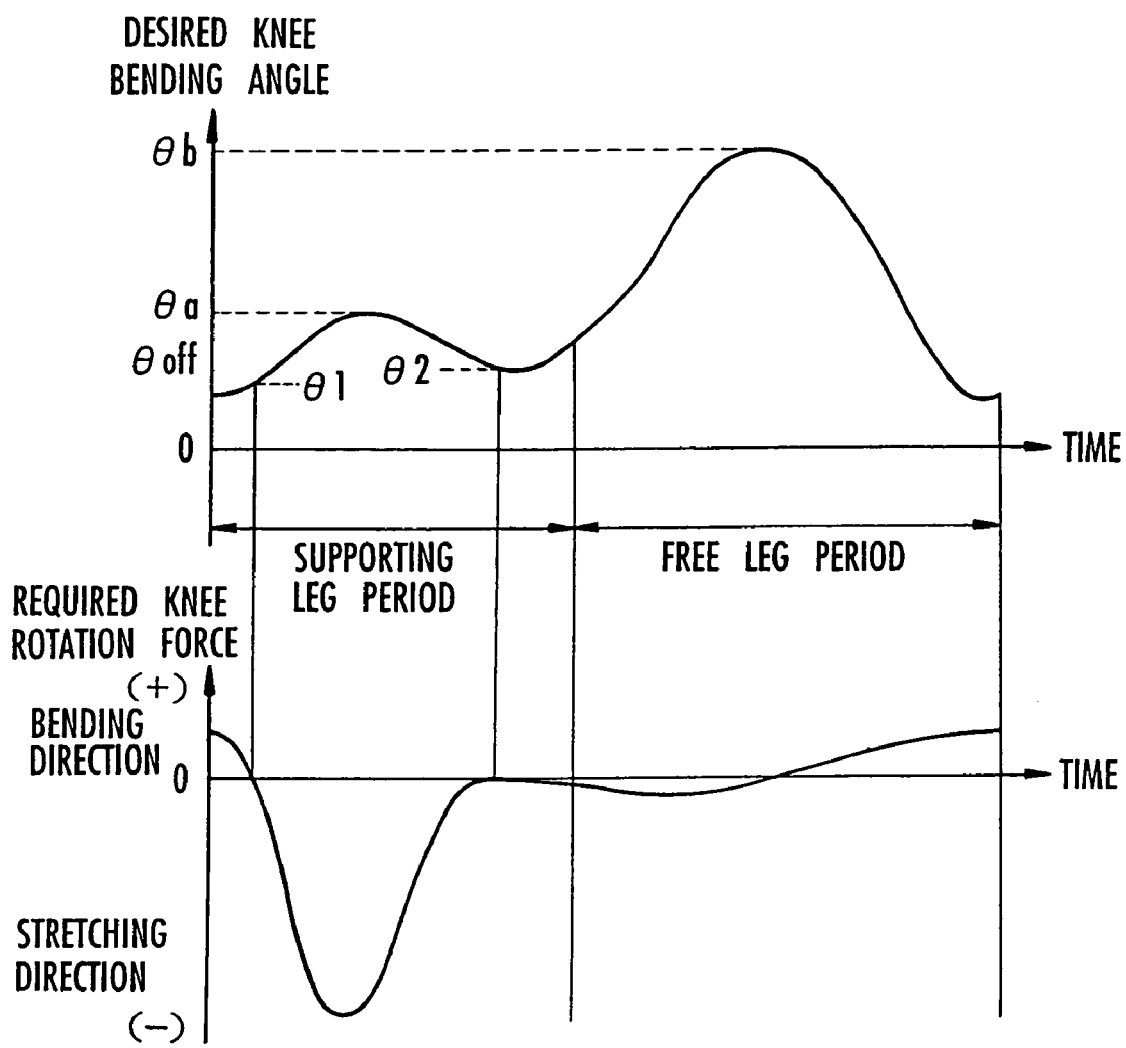

LEG JOINT ASSIST DEVICE FOR LEGGED MOVABLE ROBOT

TECHNICAL FIELD

The present invention relates to a leg joint assist device which generates an auxiliary driving force to a joint of a leg of a legged mobile robot such as a biped mobile robot, to assist a joint actuator driving the joint.

BACKGROUND ART

In a legged mobile robot having a plurality of legs, each being configured by sequentially connecting a plurality of link members from a body through a plurality of joints. For example, in a biped mobile robot having two legs like a human, each leg is configured by sequentially connecting the link members, which correspond to a thigh portion, a crus portion, and a foot portion, through a hip joint, a knee joint, and an ankle joint, respectively, from the body of the robot. In addition, in the legged mobile robot of this kind, each leg's motion for moving the robot is produced by applying driving forces to the joints of each leg by using joint actuators such as electric motors.

Incidentally, in this kind of mobile robot, when, for example, a movement speed thereof is increased, forces acting on the joints of each leg are likely to become relatively large in a foot landing state of each leg (a state of a supporting leg period of each leg), due to a floor reaction force or the like. Consequently, driving forces to be generated to the joint actuators to resist the forces are likely to become relatively large. For example, in a case of allowing the biped mobile robot to run with a gait similar to the gait (a motion pattern of legs) of a running human, the driving force to be generated to the joint actuator of the knee joint becomes large, particularly in the supporting leg period of each leg, according to the knowledge of the inventor and the like of the application concerned. In this case, when the joint actuator is, for example, an electric motor, the aforementioned driving force is generated by a regenerative operation or a powering operation of the electric motor. With any of these operations, however, it is required to energize the electric motor and a power source such as a battery with a high current. Thus, an energy loss owing to Joule heat or the like is likely to be excessively large. Further, since the electric motor with a large capacity is required, the size and weight of the electric motor become large. Note that, in general, the driving forces to be generated to the joint actuators of the knee joint and the like in a foot lifted state of each leg (a state of a free leg period of each leg) are sufficiently smaller than those in the foot landing state of each leg.

Meanwhile, as disclosed in Japanese Patent Laid-Open Publication No. 2001-198864 (especially FIG. 9 of this publication), a biped mobile robot is known in which a spring is provided between two link members (a thigh portion and a crus portion) connected by a knee joint of each leg of the robot.

While moving horizontally, this biped mobile robot transforms energy of horizontal motion of the robot into elastic energy of the spring and stores the elastic energy, thus producing jumping motion of the robot by the use of the elastic energy. In the biped mobile robot having the springs as above, a part of a driving force to be generated to each knee joint is provided by the elastic force of the spring during a part of a running motion period of the robot, particularly during the supporting leg period of each leg. Thus, a burden on the joint actuator of the knee joint can be reduced.

However, in this biped mobile robot, the elastic force of the spring increases in the bending direction of the leg as the bending degree of the leg at the knee joint becomes increasingly large. Further, for example, when the biped mobile robot is moved on a flat floor, the largest bending degree of each leg at the knee joint in the foot lifted state is generally larger than that in the foot landing state of each leg.

Therefore, in the biped mobile robot in the aforementioned publication, the elastic force of the spring is larger during the free leg period than during the supporting leg period, though the driving force to be generated to the knee joint of each leg during the free leg period can be relatively small. Hence, during the free leg period, a driving force for canceling the large elastic force of the spring must be generated to the joint actuator of the knee joint. Thus, the joint actuator of the knee joint has to generate a large driving force during the free leg period of each leg. Consequently, the driving force of the joint actuator cannot be kept relatively small over the entire period of the movement of the biped mobile robot. Moreover, in a case of causing the biped mobile robot to ascend and descend stairs, there occurs a state where the driving force to be generated to the knee joint is relatively small while the bending degree of the leg at the knee joint is relatively large. Therefore, the driving force generated to the joint actuator of the knee joint may end up being large. As a result, it is difficult to improve utilization efficiency of the total energy of the robot.

In the biped mobile robot in the aforementioned publication, the elastic force of the spring increases monotonously as the bending degree of the leg at the knee joint increases. Therefore, when the leg is fully bent during the free leg period and the like of each leg, the amount of elastic deformation of the spring becomes large. Thus, it is required to use a spring which allows such a large amount of elastic deformation, resulting in a large configuration of the spring.

The present invention was accomplished in light of the above-described circumstances. It is an object of the present invention to provide a leg joint assist device to effectively reduce burdens on joint actuators of the legged mobile robot, thereby ensuring favorable energy efficiency, and a reduction in the size of the configuration thereof.

DISCLOSURE OF THE INVENTION

The inventor and the like of the application concerned have gained the following knowledge regarding a driving force (hereinafter, referred to as a required driving force) to be generated to a joint such as a knee joint of each leg in a case of, for example, moving a legged mobile robot on a flat floor with a normal gait. Basically, the required driving force for each leg's joint becomes so large that an auxiliary driving force, other than the driving force of a joint actuator, is required only during a period when the leg is in a foot landing state (a supporting leg period of the leg). Further, the largest value of a relative displacement amount between a pair of link members connected by the joint is smaller during the supporting leg period of the leg than during a period of a foot lifted state (a free leg period of the leg). Furthermore, during the supporting leg period of the leg, the required driving force for the joint generally becomes the largest when a relative displacement amount between the pair of link members is the largest (maximum). Therefore, when generating the auxiliary driving force by the use of spring means, it is required that an elastic force of the spring means and the auxiliary driving force are increased as the relative displacement amount between the pair of link members increases in a state where the relative displacement amount is in a relatively small range up to a certain displacement amount. When the relative displacement amount is in a relatively large range, the elastic force of the spring means and the auxiliary driving force do not need to be increased.

In order to achieve the aforementioned object, the leg joint assist device for a legged mobile robot having legs, each of the legs configured by connecting a plurality of link members from a body via a plurality of joints, of the present invention comprises a spring means for generating an auxiliary driving force acting on a specific joint among a plurality of the joints with an elastic energy stored in accordance with relative displacement motion between a pair of link members connected by the specific joint, together with a driving force of a joint actuator that drives the specific joint. The spring means is characterized by being provided so that, during relative displacement motion between the pair of link members, the auxiliary driving force increases as a relative displacement amount between the pair of link members increases, when the relative displacement amount is smaller than or equal to a predetermined displacement amount, and so that the auxiliary driving force becomes smaller than or substantially equal to the auxiliary driving force obtained at the predetermined displacement amount, after the relative displacement amount exceeds the predetermined displacement amount.

According to this invention, during relative displacement motion between the pair of link members, the auxiliary driving force on the specific joint by the spring means increases as the relative displacement amount between the pair of link members increases, until the relative displacement amount is increased to the predetermined displacement amount. After the relative displacement amount exceeds the predetermined displacement amount, the auxiliary driving force becomes smaller or almost equal to the auxiliary driving force obtained at the predetermined displacement amount. In other words, until the relative displacement amount between the pair of link members is increased to the predetermined displacement amount, elastic deformation of the spring means proceeds (the spring means stores elastic energy) accompanying the relative displacement motion between both link members toward the side where the relative displacement amount increases. After the relative displacement amount between the pair of link members exceeds the predetermined displacement amount, one of the followings occurs, accompanying the relative displacement motion between both of the link members: the variation ratio of the amount of elastic energy stored by the spring means is lowered relative to a unit variation of the relative displacement amount; the elastically deformed spring means is restored to the original state thereof (the spring means releases the stored elastic energy); or the spring means is almost invariantly maintained in the elastically deformed state. Put differently again, relative displacement motion between both of the link members is transmitted to the spring means through appropriate motion transmission means so that the auxiliary driving force by the spring means changes with the above-described characteristics relative to the relative displacement amount between the pair of link members.

Therefore, in the state where the relative displacement amount between both of the link members becomes relatively large over the predetermined displacement amount (for example, a state of a free leg period of each leg when the robot is moved on a flat floor), the elastic force of the spring means and the auxiliary driving force are not increased to an excessively large force. In addition, in the state where the relative displacement amount between both of the link members becomes relatively small up to the predetermined displacement amount (for example, a state of a supporting leg period of each leg when the robot is moved on the flat floor), the elastic force of the spring means and the auxiliary driving force increase as the relative displacement amount between both of the link members increases. Thus, while the legged mobile robot is moving, the auxiliary driving force does not become unnecessarily large in a state where not so much auxiliary driving force on the specific joint by the spring means is required. In addition, in a state where the auxiliary driving force on the specific joint is required, the auxiliary driving force can be generated by the spring means without difficulties. As a result, while the legged mobile robot is moving, the burden on the joint actuator (the driving force generated to the joint actuator) driving the specific joint can be effectively reduced without increasing the burden excessively, thereby ensuring favorable utilization efficiency of energy. In a case where the joint actuator is an electric motor in particular, the driving force generated on the electric motor and a current energizing the electric motor can be relatively small. Therefore, an energy loss due to Joule heat or the like can be minimized and thus the utilization efficiency of the energy can be improved. At the same time, the relatively small electric motor can be used. Hence, the present invention is preferably applied in the case where the joint actuator is the electric motor. Further, the amount of elastic deformation of the spring means can be almost the largest when the relative displacement amount reaches the predetermined displacement amount. Thus, the configuration of the spring means can be miniaturized.

In the aforementioned invention, the relative displacement motion between the pair of link members includes relative linear motion (expansion/contraction motion of the leg at the area of the specific joint) of both of the link members, and bending/stretching motion thereof, depending on the configuration of the specific joint. When the relative displacement motion is bending/stretching motion at the specific joint in particular, it is preferred that the relative displacement amount be a bending angle between the pair of link members, decided so that the value of the bending angle increases as a bending degree between the pair of link members increases.

Generally, in a case where each leg's specific joint causes the pair of link members to perform bending/stretching motion, the bending degree between both of the link members becomes relatively large in a state where the required driving force on the joint can be relatively small, like the state of the free leg period of each leg. In a state where the required driving force on the joint is relatively large, like the state of the supporting leg period of each leg, the bending degree between both of the link members is relatively small. Further, for example, during the supporting leg period of each leg, the required driving force on the specific joint increases as the bending degree between both of the link members increases. Therefore, the relative displacement amount is defined as the bending angle between the pair of link members, decided so that the value of the bending angle increases as the bending degree between the pair of link members increases. Thus, the auxiliary driving force by the spring means appropriately changes relative to the change in the bending angle between both of the link members.

Further, when bending/stretching motion between both of the link members is performed as mentioned above, it is preferred that the predetermined displacement amount, an inflection point of the change in the auxiliary driving force by the spring means, be set to an angle smaller than the bending angle between the pair of link members at the largest bending degree in the foot lifted state of each leg while the legged mobile robot is moved on the almost flat floor with a certain gait.

According to the above, in the foot lifted state of each leg (the state of the free leg period of each leg), the auxiliary driving force of the spring means becomes almost the largest when the bending angle is smaller than that obtained when the bending degree between the pair of link members of each leg is the largest. As a result, the auxiliary driving force of spring means does not becomes excessively large when the bending degree between the pair of link members of each leg is relatively large in the foot lifted state of each leg. Thus, the burden on the joint actuator can be kept low.

Further, in this case, it is preferred that the predetermined displacement amount be set to an angle close to the bending angle between the pair of link members at the largest bending degree in the foot landing state of each leg while the legged mobile robot is moved on the almost flat floor with the certain gait.

According to the above, until the bending degree is increased to almost the largest (maximum) degree in the foot landing state of each leg (the state of the supporting leg period), the auxiliary driving force on the specific joint by the spring means increases as the bending degree between both of the link members increases. When the bending degree reaches almost the largest degree, the auxiliary driving force becomes almost the largest. Additionally, in general, the required driving force on the specific joint during the supporting leg period of each leg becomes the largest when the bending degree (the relative displacement amount) between both of the link members is almost the largest, as mentioned earlier. Therefore, while the legged mobile robot is moved on the almost flat floor with the certain gait, the auxiliary driving force by the spring means can be almost the largest when the required driving force on the specific joint is the largest. As a result, it is possible to minimize the burden on the joint actuator during the supporting leg period of each leg when the required driving force on the specific joint becomes large.

Furthermore, in the present invention in which bending/stretching motion between the pair of link members is performed at the specific joint as described earlier, it is preferred that the specific joint be a joint between a joint at a proximal end of each leg (a joint closest to the body) and a joint at a distal end of each leg. To be more specific, in the case where the legged mobile robot is a biped mobile robot having two of the legs, each configured by sequentially connecting a thigh portion, a crus portion and a foot portion serving as the link members, through a hip joint, a knee joint and an ankle joint, from the body side, it is preferred that the specific joint be the knee joint (between the hip joint at the proximal end of each leg and the ankle joint at the distal end of the same) bendably and stretchably connecting the thigh portion and the crus portion serving as the pair of link members.

This is because the joint like the knee joint between the joint at the proximal end of each leg and the joint at the distal end of the same requires the relatively large driving force in order to ensure an appropriate gait in the foot landing state of each leg while the robot is moving. At the same time, in order to lift the end of each leg off the floor, the knee joint bends larger in the foot lifted state of each leg than the foot landing state.

In the present invention described so far, the spring means may, of course, be a solid spring such as a coiled spring, a leaf spring, a torsion spring, a metal spring, rubber and the like. However, it is preferred that the spring means be a gas spring, such as an air spring, which elastically generates the auxiliary driving force by compression or expansion of gas. The gas spring is unlikely to cause vibration of its own (likely to damp the vibration), thus avoiding a situation where the auxiliary driving force acting on the specific joint is vibrational. As a result, each leg's motion can be smoothly controlled.

In the case where the relative displacement motion between the pair of link members is bending/stretching motion in particular, it is preferred that the spring means be the gas spring comprising a cylinder, a piston provided within the cylinder to be able to slide synchronously with bending/stretching motion between the pair of link members, a gas chamber formed within the cylinder, the volume of which changes as the piston slides, and gas filling the gas chamber, wherein the auxiliary driving force is generated elastically by compression or expansion of the gas within the gas chamber accompanied by a change in the volume of the gas chamber.

The spring means configured as above (hereinafter, referred to as gas spring means having a cylinder configuration) is the gas spring. Thus, each leg's motion can be smoothly controlled as described earlier. In addition, the configuration of the spring means and the configuration for transmitting bending/stretching motion between the pair of link members to the spring means (mechanical means for transforming rotary motion of the specific joint that causes the pair of link members to perform bending/stretching motion, into linear motion of the piston) become relatively simple. Furthermore, in this case, the piston is merely required to move in a direction of compressing or expanding the gas in the gas chamber, as the bending angle between the pair of link members increases within a range up to a predetermined bending angle which is equivalent to the predetermined displacement amount. Thus, a required stroke of the piston can be relatively small and thus the size of the gas spring means having the cylinder configuration can be relatively small.

Further, in the case where the spring means is configured by, for example, the gas spring means having the cylinder configuration as mentioned above, it is preferred that the assist device include: a flow passage connected to the gas chamber for allowing the gas within the gas chamber to flow to the outside of the gas chamber in order to inhibit compression or expansion of the gas within the gas chamber accompanied by the change in the volume of the gas chamber; valve means for opening and closing the flow passage; and control means for opening the valve means in the foot lifted state of each leg and for closing the valve means in the foot landing state of each leg.

According to the above, when the valve means is closed in the foot landing state of each leg (the state of the supporting leg period of each leg), the auxiliary driving force of the spring means (the gas spring means having the cylinder configuration) is generated by compression or expansion of the gas within the gas chamber accompanied by relative displacement motion (bending/stretching motion) between the pair of link members. On the other hand, when the valve means is opened in the foot lifted state of each leg (the state of the free leg period of each leg), no compression or expansion of the gas within the gas chamber occurs. Therefore, the auxiliary driving force by the spring means does not act on the specific joint. In this case, in the foot lifted state of each leg, in which the valve means is opened, the required driving force on the specific joint of the leg is generated only by the joint actuator. However, in the foot lifted state of each leg, the required driving force on the joint of the leg is relatively small as stated earlier. Therefore, in the foot lifted state of each leg, a situation is eliminated where the joint actuator is required to generate a driving force canceling out the auxiliary driving force of the spring means. Thus, the burden on the joint actuator can be reduced more effectively.

The mechanical means (the motion transmission means) is for transmitting the relative displacement motion between the pair of link members to the spring means to change the auxiliary driving force of the spring means as described earlier relative to the relative displacement amount between the pair of link members. Note that, in the present invention, this mechanical means can have various kinds of forms depending on the kinds of the spring means and relative displacement motion between the pair of link members on each side, and the like. In this case, the motion transmission means can be configured by using, for example, rotary motion to linear motion transforming means, in a case where, for example, the relative displacement motion is bending/stretching motion between the pair of link members and the spring means is linear motion type, such as a coiled spring or the gas spring means having the cylinder configuration, which generate an elastic force by straight motion. The rotary motion to linear motion transforming means is for transforming rotary motion of the specific joint into liner motion of the piston or the like through a crankshaft, a cam or the like.

Specifically, as mentioned earlier, in the present invention in which bending/stretching motion between the pair of link members is performed by the specific joint, the spring means is provided so that the auxiliary driving force is increased/decreased by straight reciprocating motion of an engagement member engaged with the spring means. In addition, the leg joint assist device includes the rotary motion to linear motion transforming means for transforming rotary motion of the rotating shaft of the specific joint, the rotary motion generating the bending/stretching motion between the pair of link members, into straight reciprocating motion and transmitting the straight reciprocating motion to the engagement member. The rotary motion to linear motion transforming means is configured to move the engagement member directionally outwards to increase the auxiliary driving force of the spring means as the bending angle between the pair of link members increases, at least until the bending angle between the pair of link members is increased to an angle equivalent to the predetermined displacement amount, and to move the engagement member directionally inwards to decrease the auxiliary driving force of the spring means, after the bending angle between the pair of link members exceeds the angle equivalent to the predetermined displacement amount.

In the present invention including the gas spring means having the cylinder configuration as mentioned earlier, the rotary motion to linear motion transforming means is included as means for sliding the piston synchronously with bending/stretching motion between the pair of link members. The rotary motion to linear motion transforming means is for transforming rotary motion of the rotating shaft of the specific joint, the rotary motion generating the bending/stretching motion between the pair of link members, into straight reciprocating motion and transmitting the straight reciprocating motion to the piston. In addition, the rotary motion to linear motion transforming means is configured to move the piston (equivalent to the engagement member) directionally outwards to increase the auxiliary driving force of the gas spring at least until the bending angle between the pair of link members is increased to the angle equivalent to the predetermined displacement amount, and to move the piston directionally inwards to decrease the auxiliary driving force of the gas spring, after the bending angle between the pair of link members exceeds the angle equivalent to the predetermined displacement amount.

By allowing the engagement member, such as the piston, to move in the reciprocating manner by the rotary motion to linear motion transforming means as above, bending/stretching motion between the pair of link members (rotary motion of the rotating shaft of the specific joint) is appropriately transmitted to the spring means through the engagement member. Thus, as described earlier, the auxiliary driving force (the elastic force) of the spring means can be appropriately changed in accordance with the bending angle between the pair of link members. In this case, the rotary motion to linear motion transforming means can be configured by the use of a crankshaft, a cam or the like. Therefore, the configuration thereof can be simple.

BRIEF DESCRIPTION OF THE DRAWINGS

FIGS. 3(a) to 3(d) are explanatory views of actuation of the assist device of the robot in FIG. 1; FIG. 4 is a diagram showing the characteristics of spring means of the assist device of the robot in FIG. 1; FIG. 5 is a diagram for explaining actuation of the assist device of the robot in FIG. 1.

BEST MODE FOR CARRYING OUT THE INVENTION

Figure 1:
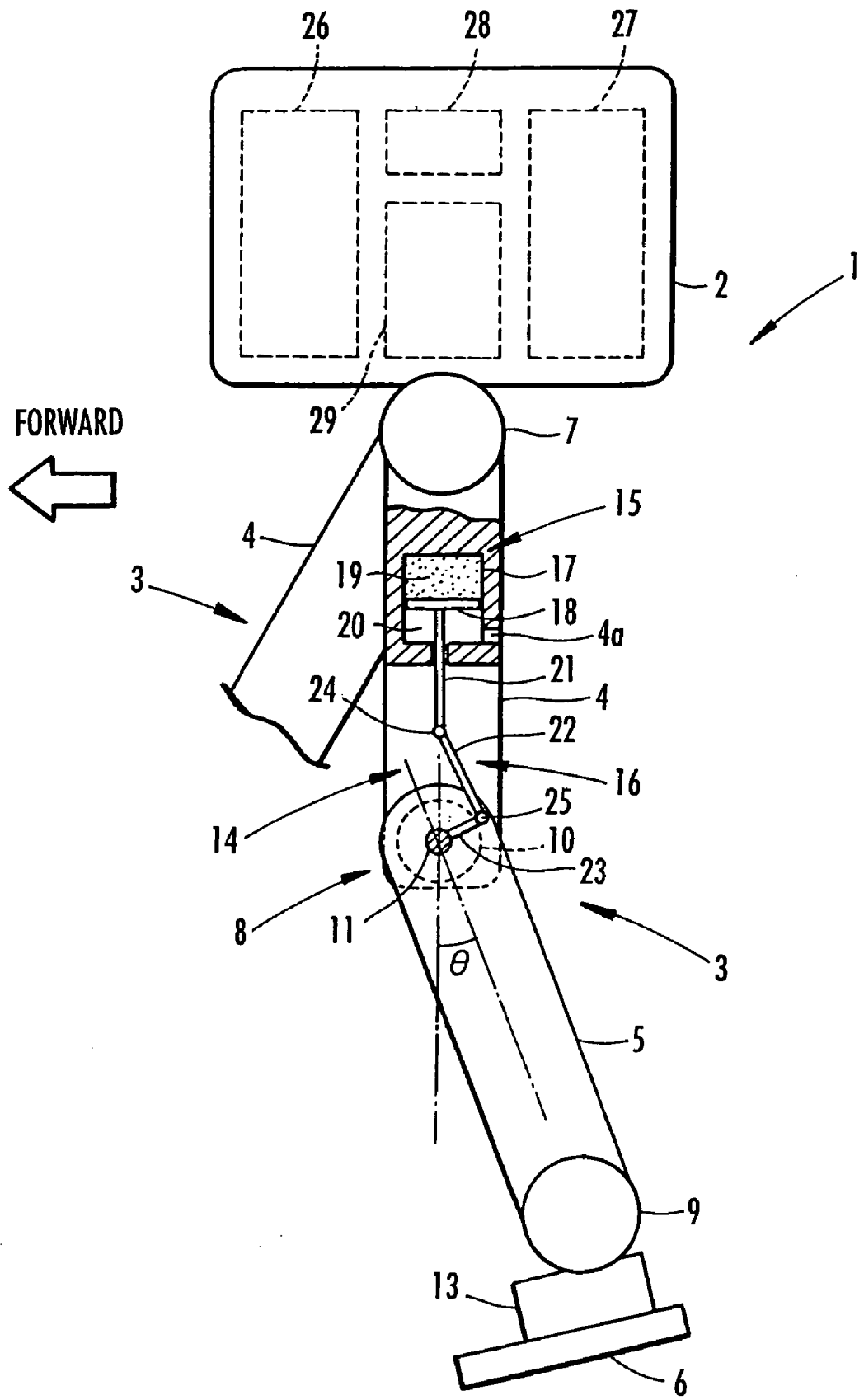
FIG. 1 is an explanatory view showing the entire configuration of a legged mobile robot in a first embodiment of the present invention.

A first embodiment of the present invention is described with reference to FIGS. 1 to 7. FIG. 1 is a schematic view depicting the configuration of a biped mobile robot serving as the legged mobile robot of this embodiment. As illustrated, the robot 1 is provided with two legs 3 and 3 extending downward from a body 2. Note that these legs 3 and 3 as well as later-described assist devices included therein have the same structure and thus one of the legs 3 (the forward-right leg 3 of the robot 1 in the figure) is shown only partially.

Similar to a leg of a human, each leg 3 is configured by sequentially connecting a thigh portion 4, a crus portion 5, and a foot portion 6 through a hip joint 7, a knee joint 8, and an ankle joint 9, respectively, from the body 2. To be more specific, the thigh portion 4 of each leg 3 extends from the body 2 through the hip joint 7, the crus portion 5 is connected to the thigh portion 4 through the knee joint 8, and the foot portion 6 is connected to the crus portion 5 through the ankle joint 9. Note that the thigh portion 4, the crus portion 5 and the foot portion 6 are equivalents of link members in this invention, respectively.

In this case, the hip joint 7 is enabled to have rotational motion about three axes in directions of front and back, right and left, and top and bottom of the robot 1. The knee joint 8 is enabled to have rotational motion about one axis in the right and left direction. The ankle joint 9 is enabled to have rotational motion about two axes in the directions of front and back, and right and left. Because of rotational motion of the respective joints 7, 8 and 9, each leg 3 can have motion almost the same as that of a leg of a human. In addition, the knee joint 8, for example, is provided with an electric motor 10 (hereinafter, referred to as a knee joint electric motor 10) serving as a joint actuator in order to perform rotational motion about one axis in the right and left direction. Further, although not illustrated, the hip joint 7 is provided with three electric motors for performing rotational motion about the three axes. The ankle joint 9 is provided with two electric motors for performing rotational motion about the two axes.

Figure 2:
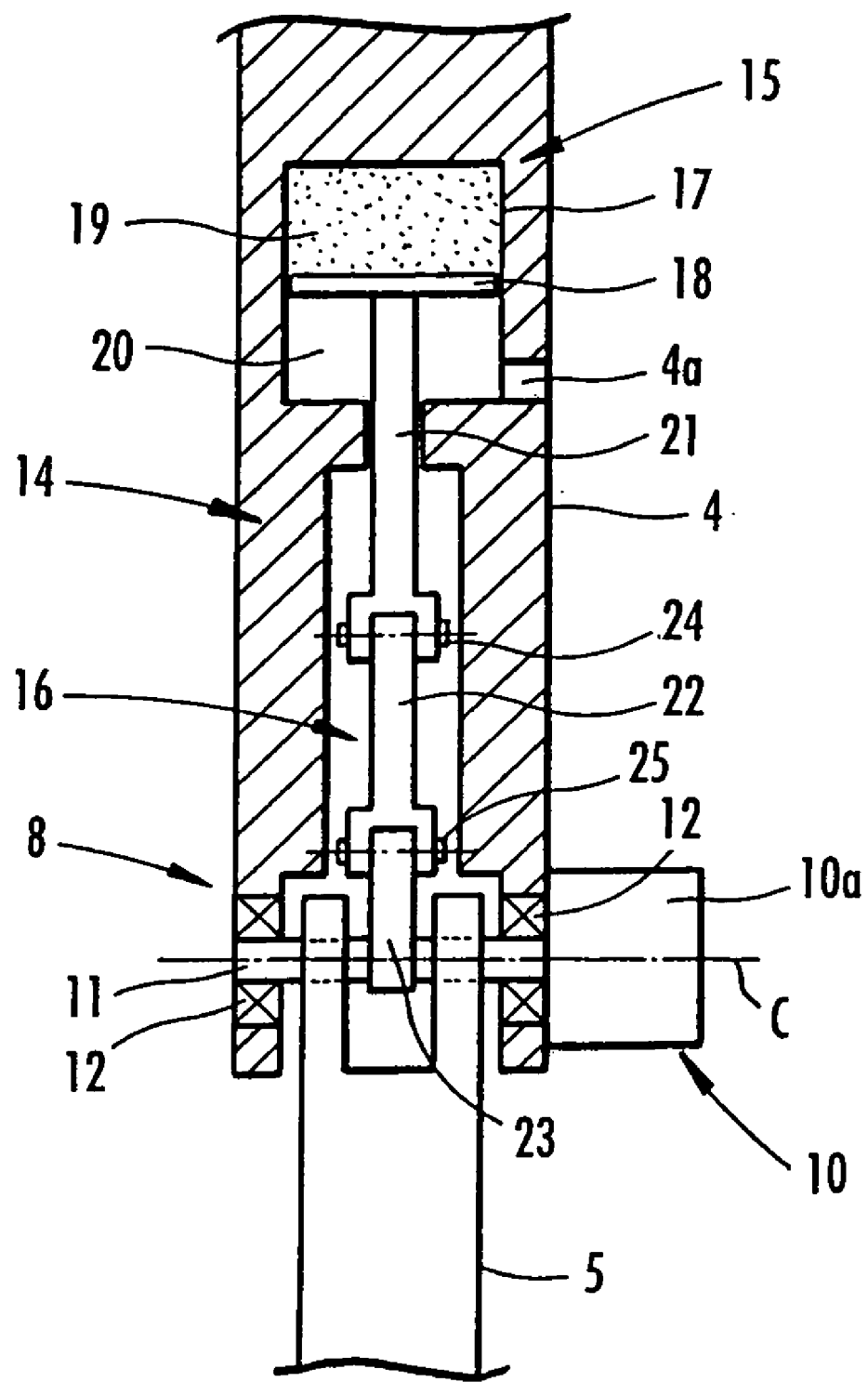
FIG. 2 is a cross sectional view showing the configurations of a knee joint and an assist device of a leg of the robot in FIG. 1.

Here, in this embodiment, the knee joint 8 is an equivalent of a specific joint in this invention. The basic structure of the knee joint 8 is further described with reference to FIG. 2. As shown in FIG. 2, the knee joint 8 has a rotating shaft portion 11 provided integrally with the crus portion 5 along the rotation axis C of the knee joint 8. Both end portions of the rotating shaft portion 11 are rotatably supported by the thigh portion 4 through bearings 12 and 12. In addition, a rotor (not shown) of the knee joint electric motor 10 is connected to one end portion of the rotating shaft portion 11. A housing 10a provided integrally with a stator (not shown) of the knee joint electric motor 10 is fixed to the thigh portion 4. Note that the rotor of the knee joint electric motor 10 may also be connected to the rotating shaft portion 11 through, for example, a speed reducer.

With the knee joint 8 configured as above, once a rotation driving force (torque) is applied to the rotating shaft portion 11 from the knee joint electric motor 10, the crus portion 5 rotates with the rotating shaft portion 11 about the rotation axis C relative to the thigh portion 4. Thus, bending/stretching motion (hereinafter, referred to as knee bending/stretching motion) is performed as relative displacement motion between the thigh portion 4 and the crus portion 5.

Note that, in this embodiment, each foot portion 6 is connected to the ankle joint 9 through a six-axis force sensor 13 as shown in FIG. 1, in order to detect a floor reaction force (specifically, translational forces in three-axis directions of front and back, right and left, and top and bottom of the robot 1 and moments about the three axes) acting on each foot portion 6. Moreover, each of the joints 7 to 9 is provided with an encoder (not shown) for detecting a rotation position thereof (specifically, a rotation angle of the electric motor of each of the joints 7 to 9).

As shown in FIGS. 1 and 2, the robot 1 includes the assist device 14 in each leg 3. The assist device 14 is for applying an auxiliary driving force (an auxiliary rotation force acting on the rotating shaft portion 11 of the knee joint 8 in parallel with the rotation driving force of the knee joint electric motor 10) to the knee joint 8 of each leg 3, serving as the specific joint in this invention.

The assist device 14 includes spring means 15 generating an elastic force and a motion transmission means 16 transmitting knee bending/stretching motion to the spring means 15. The spring means 15 is a gas spring in this embodiment and has a cylinder 17 formed within the thigh portion 4 and extending in the axis direction of the thigh portion 4 (a vertical direction in the figure), and a piston 18 (equivalent to an engagement member in this invention) slidably accommodated in the cylinder 17 in the axis direction thereof. Gas such as air (shown by stippling in FIGS. 1 and 2) is filled in a sealed manner inside, for example, the upper gas chamber 19 of gas chambers 19 and 20 formed above and under the piston 18, respectively, within the cylinder 17. Note that the lower gas chamber 20 is open to the atmosphere through an open vent passage 4a provided in the thigh portion 4 so that the air pressure within the gas chamber 20 is kept almost invariant. Further, the aforementioned cylinder 17 is provided at a position where the axis thereof intersects with the axis of the rotating shaft portion 11 of the knee joint 8.

In the spring means 15 configured as above, the volume of the gas chamber 19 changes in accordance with a sliding movement (a vertical movement in FIGS. 1 and 2) of the piston 18, and thus the gas within the gas chamber 19 is compressed or expanded. Thus, the gas stores elastic energy and an elastic force of the elastic energy acts on the piston 18. Note that, when the piston 18 moves to a position where the pressures within the respective gas chambers 19 and 20 are almost equal, the gas within the gas chamber 19 of the spring means 15 is in a state where the elastic energy thereof is released. Therefore, the elastic force does not act on the piston 18.

The aforementioned motion transmission means 16 is rotary motion to linear motion transforming means for transforming knee bending/stretching motion (rotary motion of the rotating shaft portion 11) into linear motion (straight motion) and transmitting linear motion to the piston 18 of the spring means 15. The motion transmission means 16 includes a piston rod 21 extending concentrically with the cylinder 17 toward the knee joint 8 from the piston 18 through the gas chamber 20, and first and second link arms 22 and 23 connecting the end portion (the lower end portion in FIGS. 1 and 2) of the piston rod 21 to the rotating shaft portion 11 of the knee joint 8. One end portion of the first link arm 22 is rotatably connected to the end portion of the piston rod 21 through a pivot 24 whose axis is parallel with the rotating shaft portion 11. The other end portion of the first link arm 22 is rotatably connected to one end portion of the second link arm 23 through a pivot 25 whose axis is parallel with the rotating shaft portion 11. The other end of the second link arm 23 is fixed to the circumferential portion of the rotating shaft portion 11, thus rotating integrally with the rotating shaft portion 11 about the rotation axis C.

In the motion transmission means 16 configured as above, the piston 18 moves together with the piston rod 21 in the axis direction of the cylinder 17, in accordance with knee bending/stretching motion (rotary motion of the rotating shaft portion 11). Thus, the gas within the aforementioned gas chamber 19, serving as an elastic body of the aforementioned spring means 15, is compressed or expanded, thereby generating an elastic force. This elastic force acts as an auxiliary driving force (hereinafter, referred to as an auxiliary knee rotation force) on the rotating shaft portion 11 of the knee joint 8 through the piston 18, the piston rod 21, and the first and second link arms 22 and 23 sequentially.

Description is further provided regarding motion of the aforementioned piston 18 accompanied by knee bending/stretching motion of the leg 3, and the characteristics of changes of the aforementioned auxiliary knee rotation force. In the assist device 14 of this embodiment, the moved position of the piston 18 changes as shown in FIGS. 3(*a*) to 3(*d*) during knee bending/stretching motion. At this time, the auxiliary knee rotation force of the spring means 15 changes as shown in FIG. 4 relative to a knee bending angle θ, a bending angle between the thigh portion 4 and the crus portion 5 of each leg 3.

Note that, in FIGS. 3(*a*) to 3(*d*), the thigh portion 4 is illustrated by an imaginary line and the crus portion 5 is illustrated like a stick, as a matter of convenience. Additionally, the above-described knee bending angle θ is defined as an angle formed by the axis of the crus portion 5 relative to the axis of the thigh portion 4, as shown in FIG. 1. Hence, a state where the leg 3 is stretched so that the axes of the thigh portion 4 and the crus portion 5 extend in the same direction (a state shown in FIG. 3(*a*)) is a state where θ=0. The knee bending angle θ increases as the bending degree of the leg 3 at the knee joint 8 becomes larger. In addition, in FIG. 4, the auxiliary knee rotation force in the bending direction of the leg 3 at the knee joint 8 is expressed by a positive value, and the same in the stretching direction of the leg 3 is expressed by a negative value.

Before describing aforementioned motion of the piston 18 and the characteristics of the auxiliary knee rotation force of the spring means 15, a form of movement performed by the robot 1 in this embodiment is described with reference to FIG. 5. In this embodiment, the robot 1 is caused to perform running motion with footsteps similar to those of normal running motion of a human on a flat ground (flat floor) (hereinafter, referred as a normal running gait of a human). When causing the robot 1 to perform this kind of running motion, a desired value of the knee bending angle θ of each leg 3 (decided depending on a later-described desired gait of the robot 1 and hereinafter referred to as a desired knee bending angle) changes with time as shown in, for example, an upper diagram of FIG. 5. Additionally, a rotation force required to be generated to the rotating shaft portion 11 of the knee joint 8 of the leg 3 in accordance with the desired knee bending angle, changes with time as shown in, for example, a lower diagram in FIG. 5.

Specifically, in the case of causing the robot 1 to run on a flat floor with a similar gait to that of the normal running gait of a human, the desired knee bending angle increases (the bending degree of the leg 3 at the knee joint 8 becomes larger) during the first half of a supporting leg period when the foot portion 6 of the leg 3 is in a foot landing state, as shown in the upper diagram in FIG. 5. During the latter half of the supporting leg period, the desired knee bending angle decreases (the bending degree of the leg 3 at the knee joint 8 becomes smaller) until a moment immediately before the end of the supporting leg period. Further, the desired knee bending angle increases from the moment immediately before the end of the supporting leg period through the first half of a free leg period (a period when the foot portion 6 of the leg 3 is in a foot lifted state). Thereafter, the desired knee bending angle decreases during the latter half of the free leg period until a moment immediately before the end of the free leg period. The desired knee bending angle slightly increases at the moment immediately before the end of the free leg period. Therefore, maximum values θa and θb of the desired knee bending angle during the running motion of the robot 1 are observed at mid points of the supporting leg period and the free leg period, respectively. Minimum values of the same are observed at the moment immediately before the end of the supporting leg period and at the moment immediately before the end of the free leg period.

Note that, in description below, the maximum values θa and θb of the desired knee bending angle during the supporting leg period and the free leg period of the leg 3 are referred to as a supporting leg period maximum knee bending angle θa and a free leg period maximum knee bending angle θb, respectively. During running motion of the robot 1 with the similar gait to that of the normal running gait of a human, it is generally preferred that the above-mentioned supporting leg period maximum knee bending angle θa be within a range from about 40 to 60 degrees. The above-mentioned free leg period maximum knee bending angle θb is larger than the supporting leg period maximum knee bending angle θa and, for example, is about twice as large as the supporting leg period maximum knee bending angle θa.

As shown in the lower diagram in FIG. 5, during the first half of the supporting leg period (a period when the desired knee bending angle generally increases), the required knee rotation force described above (this rotation force in the bending direction of the leg 3 is expressed by a positive value and the same in the stretching direction is expressed by a negative value) greatly decreases from a positive rotation force to a negative rotation force (the required knee rotation force greatly increases to the stretching direction of the leg 3). During the latter half of the supporting leg period until the moment immediately before the end of the supporting leg period (the period when the desired knee bending angle generally decreases), the absolute value of the required knee rotation force decreases (the required knee rotation force in the stretching direction of the leg 3 decreases), and becomes almost "0" at the moment immediately before the end of the supporting leg period. Further, from the moment immediately before the end of the supporting leg period through the first half of the free leg period, the required knee rotation force slowly and slightly decreases to a negative value. Thereafter, during the latter half of the free leg period, the required knee rotation force slowly increases from the negative value to a positive value. Therefore, the required knee rotation force during running motion of the robot 1 becomes large in the stretching direction of the leg 3 especially during the supporting leg period. The required knee rotation force in the stretching direction during the supporting leg period generally increases as the desired knee bending angle increases, and decreases as the desired knee bending angle decreases. In addition, the required knee rotation force in the stretching direction during the supporting leg period becomes the largest (maximum) almost simultaneously with the point at which the desired knee bending angle reaches the foregoing supporting leg period maximum knee bending angle θa.

In this embodiment, in consideration of the characteristics of changes of the above-described desired knee rotation angle and the required knee rotation force with time during running motion of the robot 1, the motion characteristics of the piston 18 of the foregoing assist device 14 and the characteristics of the auxiliary knee rotation force of the spring means 15 are set as follows. In the foregoing assist device 14, when bending motion of the leg 3 at the knee joint 8 is performed from a state where the leg 3 is stretched as shown in FIG. 3(*a*) (the state of θ=0), the piston 18 moves in a direction to compress the gas in the gas chamber 19 (upward in the figure) in a state where the knee bending angle θ is relatively small (for example, a state of FIG. 3(*b*)). When the knee bending angle θ is further increased and reaches a predetermined angle θx shown in FIG. 3(*c*), there occurs a state where the piston 18 is fully moved in the direction to compress the gas in the gas chamber 19 (the piston 18 reaches a top dead center). When the knee bending angle θ is increased yet further, exceeding the predetermined angle θx mentioned above (for example, a state of FIG. 3(*d*)), the moving direction of the piston 18 changes to the opposite direction (downward in the figure) to the above. Note that the state of FIG. 3(*d*) is, for example, a state where the knee bending angle θ is the foregoing free leg period maximum knee bending angle θb.

In other words, in this embodiment, the motion transmission means 16 (specifically, lengths and posture of the first and second link arms 22 and 23, relative to the moved position of the piston 18) is configured so that the piston 18 reaches the top dead center when the knee bending angle θ becomes the aforementioned predetermined angle θx (<θb). In this case, in the present embodiment, the predetermined angle θx (hereinafter, referred to as a piston top dead center angle θx) is set to be smaller than the aforementioned free leg period maximum knee bending angle θb during the aforementioned running motion of the robot 1, and slightly larger than the aforementioned supporting leg period maximum knee bending angle θa.

Owing to aforementioned motion of the piston 18, the auxiliary knee rotation force of the spring means 15 changes, exhibiting the characteristics shown in FIG. 4 relative to the knee bending angle θ. Specifically, as the knee bending angle θ is increased from "0" by bending motion of the leg 3 at the knee joint 8, the auxiliary knee rotation force of the spring means 15 decreases from a positive value (a rotation force in the bending direction of the leg 3) to a negative value (a rotation force in the stretching direction of the leg 3) until the knee bending angle θ reaches a predetermined angle θy slightly smaller than the aforementioned piston top dead center angle θx. In other words, the auxiliary knee rotation force increases from the bending direction of the leg 3 to the stretching direction of the same as the knee bending angle θ increases. When the knee bending angle θ is further increased and becomes a value within a range from the predetermined degree θy mentioned above to a predetermined degree θy' slightly larger than the piston top dead center angle θx (a range of θy<θ<θy'), specifically, a range near the aforementioned piston top dead center angle θx, the auxiliary knee rotation force is turned from a value in the stretching direction to a value in the bending direction. Note that, |θx−θy| is equal to |θx−θy'|. Further, when the θ is equal to θx, the auxiliary knee rotation force is "0."

Further, when the knee bending angle θ exceeds the predetermined angle θy', the auxiliary knee rotation force of the spring means 15 decreases in the bending direction of the leg 3 as the knee bending angle θ increases. That is to say, the auxiliary knee rotation force becomes the largest (maximum) in the stretching direction of the leg 3 at the predetermined angle θy slightly smaller than the piston top dead center angle θx. The auxiliary knee rotation force also becomes the largest (maximum) in the bending direction of the leg 3 at the predetermined angle θy' slightly larger than the piston top dead center angle θx. In this case, the magnitudes (absolute values) of the auxiliary knee rotation forces at the predetermined angles θy and θy' mentioned above are the same. Therefore, the absolute value of the auxiliary knee rotation force becomes the largest at the predetermined angles θy and θy' mentioned above (hereinafter, θy and θy' are referred to as maximum auxiliary force angles).

Here, in this embodiment, of the aforementioned maximum auxiliary force angles θy and θy', the maximum auxiliary force angle θy smaller than the piston top dead center angle θx is the knee bending angle θy shown in the foregoing FIG. 3(*b*). This maximum auxiliary force angle θy is set to be close to and slightly larger than the supporting leg period maximum knee bending angle θa (θa<θy). In addition, in this embodiment, the pressure of the gas in the gas chamber 19 is adjusted in advance as follows. When the knee bending angle θ becomes a predetermined angle θz (see FIG. 4), the pressure of the gas in the gas chamber 19 of the foregoing cylinder 17 becomes almost equal to the pressure within the gas chamber 20 (≈atmospheric pressure) and thus the elastic force of the gas does not act on the piston 18 (the spring means 15 has released the elastic energy), and consequently, the aforementioned auxiliary knee rotation force becomes "0" The predetermined angle θz is set in advance to be close to an angle (the angle θ1 in FIG. 5) at which the foregoing required knee rotation force becomes "0" during the first half of the supporting leg period of each leg 3 during foregoing running motion of the robot 1, or to be close to an angle (the angle θ2 in FIG. 5) at which the foregoing required knee rotation force becomes "0" during the latter half of the supporting leg period. Note that the predetermined angle θz described above is smaller than the aforementioned maximum auxiliary force angle θy and the supporting leg period maximum knee bending angle θa, and is within a range, for example, from 5 to 15 degrees.

Referring back to FIG. 1, mounted within the body 2 of the robot 1 are: a control unit 26 which performs, for example, operation control of the respective joints 7 to 9 of each leg 3; an electric storage device 27 as a power source of the electric motors of the respective joints 7 to 9, and the like; an inclination sensor 28 which detects the inclination angle of the body 2; a motor driver circuit 29 for controlling energizing of the respective electric motors; and the like. Note that the inclination sensor 28 is configured by using a gyro sensor, an acceleration sensor or the like. Moreover, the electric storage device 27 is configured by a battery (secondary battery), a condenser or the like.

Figure 6:
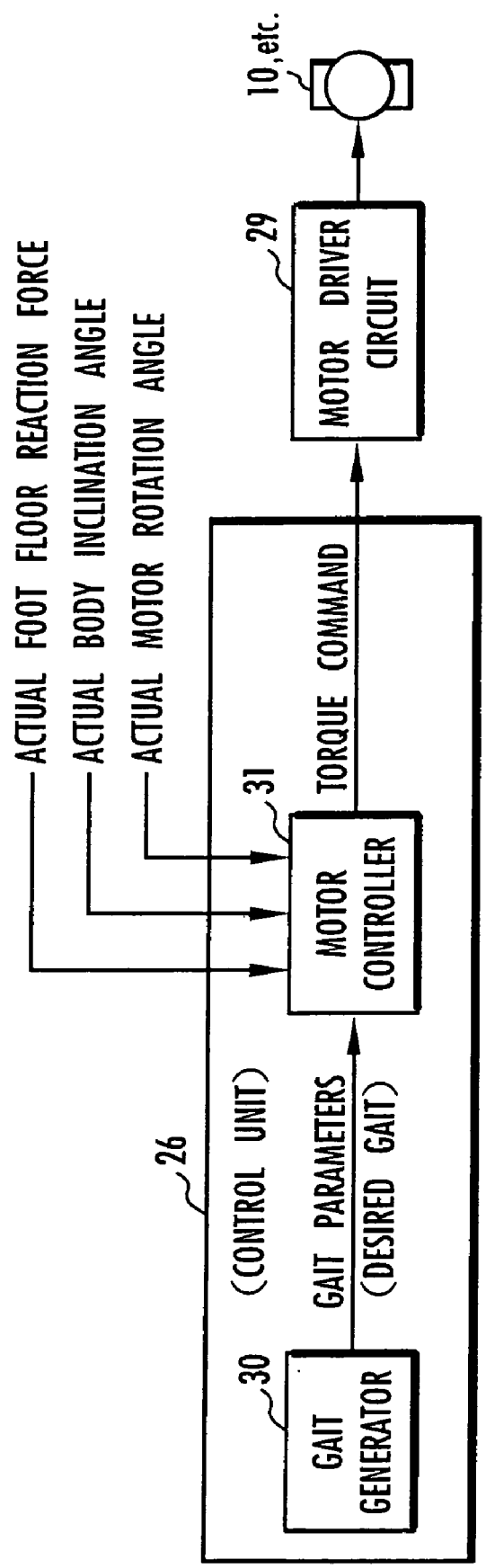
FIG. 6 is a block diagram showing the functional configuration of a control unit provided in the robot in FIG. 1.

The control unit 26 is configured by electronic circuits including a microcomputer and the like. As shown in FIG. 6, the control unit 26 includes a gait generator 30 and a motor controller 31 as functional constituents thereof.

For each step (every time a supporting leg changes) while the robot 1 is moving, the gait generator 30 decides gait parameters (length of step, walking cycle, motion mode and the like) which define desired gaits of both legs 3 and 3 (desired form of motion of both legs 3 and 3) of the robot 1, in accordance with a command from the outside, teaching data (data for a planned movement) which has been already set, or the like. Further, based on the gait parameters, the gait generator 30 generates a desired gait (a desired instantaneous gait) for each predetermined control cycle. Here, the gait parameters generated by the gait generator 30 in this embodiment are parameters which define the desired gaits for permitting the robot 1 to perform normal walking motion and for permitting the robot 1 to perform running motion with a similar gait to the normal running gait of a human. The desired gait includes, for example: desired values of position 6 and posture of the body 2 of the robot 1 (hereinafter, referred to as desired body position/posture); desired values of position and posture of each foot portion of the robot 1 (hereinafter, referred to as desired foot position/posture); a desired value of a resultant force (total floor reaction force) of floor reaction forces (translation forces and moments) acting on the respective foot portions 6 and 6 (hereinafter, referred to as desired total floor reaction force); and a desired position of so-called ZMP (Zero Moment Point) (hereinafter, referred to as a desired ZMP) as a point of action of the total floor reaction force. Note that further details of constituents of the aforementioned desired gait are provided, for example, in Japanese Patent Laid-Open Publication NO. Heisei 11-300660 by the applicant of the application concerned. Thus, detailed description thereof is omitted herein. Moreover, the content of the desired gait is not limited to that disclosed in the above-mentioned publication, as long as it can basically realize a desired form of the motion of the robot 1.

The motor controller 31 sequentially controls the electric motors, including the foregoing knee joint electric motor 10, of the respective joints 7 to 9 (specifically, sequentially controls rotation angles of the electric motors). As described later, this motor controller 31 sequentially generates torque commands (specifically, command values defining currents for energizing the electric motors), which define torque to be generated in the respective electric motors, based on the desired gait generated by the gait generator 30, an actual inclination angle of the body 2 detected by the aforementioned inclination sensor 28, actual rotation angles of the respective joints 7 to 9 of the leg 3 detected by using the unillustrated encoders, data of an actual floor reaction force of each foot portion 6 detected by the foregoing six-axis force sensor 13, and the like. Thereafter, the motor controller 31 outputs the generated torque commands to the motor driver circuit 29, causing the respective electric motors to generate torque in accordance with the torque commands through the motor driver circuit 29.

Next, actuation of a system of this embodiment is described. The aforementioned control unit 26 performs a predetermined initialization process such as initialization of a timer and the like, and thereafter executes processing of the flowchart in FIG. 7 for each predetermined control cycle (for example, 50 ms) which is set in advance. Specifically, the control unit 26 first determines whether a switch moment of the gait of the robot 1 exists (STEP 1). To be more specific, the switch moment of the gait is the instance of the supporting leg, one of the legs 3, switching to the other leg 3, while the robot 1 is moving. When the switch moment of the gait does not exist in STEP 1, the processing of the control unit 26 proceeds to a process in STEP 3 which will be described later.

When the switching moment of the gait exists in STEP 1, the control unit 26 causes the foregoing gait generator 30 to generate (renew) the gait parameters which define the desired gait of the robot 1, based on a motion command of the robot 1 given from the outside or the data for a planned movement set in advance (STEP 2). Here, the desired gait defined by the gait parameters generated by the gait generator 30 is a desired gait used until the next switch moment of the gait or the moment slightly after the next switch moment of the gait. Additionally, in this case, the desired gait defined by the gait parameters generated by the gait generator 30 is a desired gait of running motion of the robot 1, for example, in a case where the motion command, indicating that the robot 1 should perform running motion, is given from the outside, or in a situation where the robot 1 should perform running motion according to the data for a planned movement of the robot 1. The desired knee bending angle, defined in accordance with the desired gait in this case, shows the above-mentioned changes with time as shown in FIG. 5.

Next, the control unit 26 executes processes of STEPS 3 to 5 by use of the motor controller 31. The processes of STEPS 3 to 5 are for obtaining torque commands to the electric motors of the respective joints 7 to 9. These torque commands (hereinafter, referred to as preliminary torque commands) are required in order to direct motion of the robot 1 to follow the aforementioned desired gait, when the auxiliary knee rotation force by the spring means 15 does not act on the knee joint 8. Note that the processes of STEPS 3 to 5 have already been detailed in Japanese Patent Laid-Open Publication No. Heisei 11-300660 by the applicant of the application concerned. Therefore, brief outlines of the processes of STEPS 3 to 5 are provided in the following.

In STEP 3, the control unit 26 obtains a desired instantaneous gait based on the gait parameters currently generated by the gait generator 30. The desired instantaneous gait is the desired gait for each control cycle of the processing by the control unit 26. As mentioned earlier, the desired instantaneous gait includes the desired body position/posture, the desired foot position/posture, the desired total floor reaction force, and the desired ZMP, for each control cycle. Note that, in the process of STEP 3, a desired floor reaction force of each leg 3 for each control cycle as well as a point of action of the desired floor reaction force of the same are further obtained, based on the above-mentioned desired foot position/posture, the desired total floor reaction force, the desired ZMP and the like.

In STEP 4, the control unit 26 corrects the desired foot position/posture of the above-mentioned desired instantaneous gait by a composite-compliance operation process. To be more specific, in this composite-compliance operation process, obtained is a floor reaction force (moment) which should act on the robot 1 in order to restore the actual inclination angle of the body 2 of the robot 1 (detected by the foregoing inclination sensor 28) to a desired inclination angle set by the aforementioned desired body position/posture (in order to cause the deviation between the actual inclination angle and the desired inclination angle to be "0"). Thereafter, a resultant force of this floor reaction force (moment) and the aforementioned desired total floor reaction force is set as a desired value of the entire floor reaction force which should actually act on the robot 1. Subsequently, the desired foot position/posture for each control cycle is corrected so that a resultant force of the actual floor reaction force of each foot portion 6, detected by the six-axis sensor 13 of each foot portion 6, follows the desired value. This kind of composite-compliance operation process is for ensuring autonomous stability of the posture of the robot 1.

In STEP 5, the control unit 26 obtains the preliminary torque commands to the respective electric motors of the joints 7 to 9 of each leg 3 of the robot 1. To be more specific, in this process, desired rotation angles of the respective joints 7 to 9 of each leg 3 of the robot 1 are obtained by an inverse kinematics calculation processing based on a model of the robot 1 (a rigid body link model), using the desired body position/posture in the desired instantaneous gait, the desired foot position/posture corrected in STEP 4 as mentioned above, and the like. Thereafter, the preliminary torque commands to the electric motors of the respective joints 7 to 9 are obtained so that actual rotation angles of the respective joints 7 to 9 (detected by the unillustrated encoders provided in the joints 7 to 9, respectively) follow these desired rotation angles.

In this case, for example, the preliminary torque command (which corresponds to the aforementioned required knee rotation force) to the knee joint electric motor 10 of each leg 3 is obtained by the following equation (1) using a deviation $\Delta\theta$ between the desired knee bending angle of the knee joint 8 and an actual knee bending angle $\theta$ of the knee joint 8 (detected value of the knee bending angle $\theta$), and torque Tff of the knee joint electric motor 10 (hereinafter, referred to as a reference torque Tff) required to generate the aforementioned desired floor reaction force to the leg 3.

$$\text{Preliminary torque command} = Kp \cdot \Delta\theta + Kv \cdot (d\Delta\theta/dt) + \text{Tff} \quad (1)$$

Note that the reference torque Tff used for the calculation in the equation (1) is obtained by the inverse kinematics calculation processing (inverse dynamics calculation processing) based on a model of the robot 1, using the desired body position/posture, the desired foot position/posture, the desired floor reaction force to the leg 3, desired rotation angular acceleration of each of the joints 7, 8 and 9, and the like. Further, factors Kp and Kv of the equation (1) are gain coefficients set in advance. A factor $d\Delta\theta/dt$ is the time derivative of the deviation $\Delta\theta$.

Here, the first and second terms on the right hand side of the equation (1) are feedback control terms in accordance with the above-mentioned deviation $\Delta\theta$. The third term on the right hand side of the same is a feed-forward control term for compensating an influence of the floor reaction force acting on the leg 3. The second term on the right hand side, in particular, is a term having a buffer function (damping function) which swiftly damps vibration relative to the desired value of the knee bending angle $\theta$.

The preliminary torque commands to the electric motors of the respective joints 7 and 9 other than the knee joint 8 are obtained in a similar manner to the above. As described earlier, the preliminary torque commands obtained in this manner are torque commands to the electric motors of the respective joints 7 to 9, required to cause motion of the robot 1 to follow the foregoing desired gait in the case where the auxiliary knee rotation force by the spring means 15 of the assist device 14 does not act on the knee joint 8.

Next, the control unit 26 estimates the auxiliary knee rotation force (specifically, the auxiliary knee rotation force for each control cycle) by the spring means 15 of the assist device 14 (STEP 6). An estimated value of the auxiliary knee rotation force is used by the motor controller 31 to decide a final torque command to the knee joint electric motor 10. In this embodiment, the estimated value is obtained by the motor controller 31, for example, in the following manner. Data representing the characteristics, shown in FIG. 4, of the auxiliary knee rotation force of the spring means 15 relative to the knee bending angle $\theta$ is stored in advance in an unillustrated memory as a data table or as an approximate expression of the characteristics. The motor controller 31 then estimates the auxiliary knee rotation force from a detected value (or a desired value) of the current knee bending angle $\theta$, based on the above-mentioned data table or the approximate expression. Note that the auxiliary knee rotation force can be detected directly by using a force sensor or the like.

Next, the control unit 26 causes the motor controller 31 to decide final torque commands as ultimate torque commands to the electric motors of the respective joints 7 to 9 of the leg 3 for each control cycle (STEP 7). In this case, the final torque command to the knee joint electric motor 10 is decided by subtracting the auxiliary knee rotation force obtained in the foregoing STEP 6 from the preliminary torque command (the command value of torque to be generated to the knee joint 8 in accordance with the desired gait, on assumption that the auxiliary knee rotation force is "0") obtained by the equation (1) in the foregoing STEP 5. Specifically, the final torque command to the knee joint electric motor 10 is generated such that the sum of the auxiliary knee rotation force and the final torque command to the knee joint electric motor 10 (the command value of torque to be actually generated to the knee joint electric motor 10) becomes the preliminary torque command. Note that, for the final torque command to each electric motor of each of the joints 7 and 9 other than the knee joint 8, the foregoing preliminary torque command is used as it is.

Next, the control unit 26 outputs the final torque commands decided as above to the motor driver circuit 29 (STEP 8), thus ending the processing for each control cycle. In response to the output of the final torque commands, the electric motors of the respective joints 7 to 9 are energized and controlled so that the rotation angles of the electric motors, in other words, the rotation angles of the respective joints 7 to 9 follow required rotation angles decided on the basis of the foregoing desired body position/posture and the desired foot position/posture (corrected in the foregoing composite-compliance operation processing). Hence, the robot 1 moves in accordance with the desired gait defined by the gait parameters.

In the system of this embodiment, during the supporting leg period of each leg 3 in running motion of the robot 1, the auxiliary knee rotation force of the spring means 15 increases in the stretching direction of the leg 3 during a period when the knee bending angle $\theta$ increases. Meanwhile, the auxiliary knee rotation force of the spring means 15 (the auxiliary knee rotation force in the stretching direction of the leg 3) decreases during a period when the knee bending angle $\theta$ decreases. Therefore, basically, during a period when the required knee rotation force largely increases in the stretching direction of the leg 3, the auxiliary knee rotation force of the spring means 15 increases accompanied by the increase in the required knee rotation force. Subsequently, during a period when the required knee rotation force in the stretching direction of the leg 3 decreases, the auxiliary knee rotation force of the spring means 15 decreases accompanied by the decrease in the required knee rotation force. In other words, during the supporting leg period of each leg 3, the auxiliary knee rotation force of the spring means 15 increases and decreases, accompanied by increases and decreases in the required knee rotation force in the stretching direction of the leg 3. Additionally, in this case, the auxiliary knee rotation force of the spring means 15 reaches a maximum value at the moment at which the required knee rotation force in the stretching direction of the leg 3 becomes approximately the largest. Therefore, in the supporting leg period of each leg 3, the driving force (torque) generated by the knee joint electric motor 10 can be relatively small.

Further, during the free leg period of each leg 3, during a period when the knee bending angle $\theta$ increases to the foregoing free leg period maximum knee bending angle $\theta b$, the auxiliary knee rotation force of the spring means 15 increases in the stretching direction of each leg 3, accompanied by an increase in the knee bending angle $\theta$, until the knee bending angle $\theta$ reaches the maximum auxiliary force angle $\theta y$ slightly smaller than the foregoing piston top dead center angle $\theta x$. However, at the knee bending angle $\theta$ over the above-mentioned maximum auxiliary force angle $\theta y$, the magnitude (absolute value) of the auxiliary knee rotation force of the spring means 15 is smaller than the magnitude of the auxiliary knee rotation force at the maximum auxiliary force angle $\theta y$, or equal to the magnitude of the auxiliary knee rotation force at the maximum auxiliary force angle $\theta y$ (in a case of $\theta = \theta y'$). Therefore, during the free leg period of each leg 3, the magnitude (absolute value) of the auxiliary knee rotation force of the spring means 15 is not larger than the auxiliary knee rotation force obtained at the maximum auxiliary force angle $\theta y$, and thus is not completely different from the required knee rotation force relative to the knee bending angle θ. Thus, the driving force (torque) generated to the knee joint electric motor 10 during the free leg period is not excessively large, and can be relatively small.

Therefore, during the entire period, which is a combination of the supporting leg period and the free leg period of each leg 3 in running motion of the robot 1, the driving force generated to the knee joint electric motor 10 can be relatively small. Therefore, there is not a situation where the knee joint electric motor 10 must be energized with a high current. Thus, the energy loss due to Joule heat or the like is smaller.

Moreover, during the supporting leg period of the leg 3, in the state where the knee bending angle θ is increasing, the spring means 15 generates the elastic force (auxiliary knee rotation force) while storing the elastic energy by the kinetic energy of the robot 1. Thereafter, in the state where the knee bending angle θ is decreasing, the spring means 15 generates the elastic force (auxiliary knee rotation force) while releasing the stored elastic energy. In this case, in general, an energy loss occurring in switching between the elastic energy of the spring means 15 and the kinetic energy of the robot 1 is extremely small.

As a result, utilization efficiency of energy can be favorably ensured in the system of this embodiment.

Moreover, the piston 18 of the spring means 15 reaches the top dead center at the knee bending angle θ (=the piston top dead center angle θx) smaller than the foregoing free leg period maximum knee bending angle θb. Therefore, a movable area of the piston 18 becomes relatively small. Thus, the spring means 15 can have a small configuration.

Furthermore, in this embodiment, the maximum auxiliary force angle θy is set to be slightly larger than the supporting leg period maximum knee bending angle θa. Therefore, the auxiliary knee rotation force of the spring means 15 is increased/decreased monotonously (linearly) relative to increases and decreases in the knee bending angle θ during the supporting leg period of the leg 3. Thus, the stability of the robot 1 obtained by the aforementioned composite-compliance operation processing can be ensured smoothly.

Next, a second embodiment of the present invention is described with reference to FIG. 8. Note that this embodiment is different from the above-described first embodiment only in a part of the configuration of the assist device. Thus, reference numerals and figures same as those in the first embodiment are used for the same constituents as those of the first embodiment, and description thereof is omitted.

Figure 8:
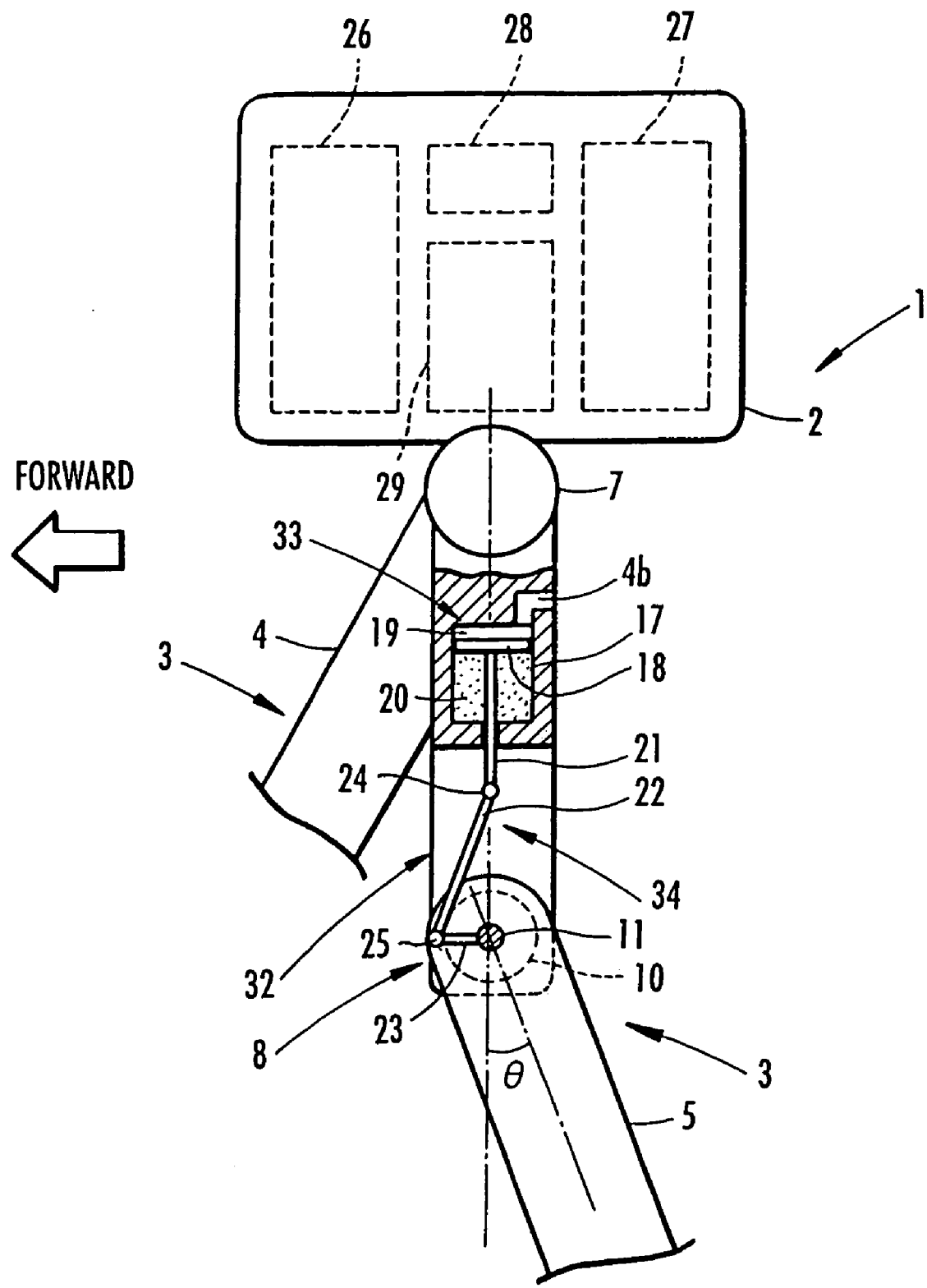
FIG. 8 is an explanatory view showing the configuration of an assist device in a second embodiment of the present invention.

Referring to FIG. 8, similar to the assist device of the first embodiment, an assist device 32 of this embodiment is configured by spring means 33, which is a gas spring, and motion transmission means 34 (rotary motion to linear motion transforming means) for transmitting knee bending/stretching motion to the spring means 33. In this case, the basic configuration of the spring means 33 is the same as that of the spring means 15 of the foregoing first embodiment, and includes the cylinder 17 and the piston 18. However, in this embodiment of the gas chambers 19 and 20 within the cylinder 17, the gas chamber 20 under the piston 18 is filled with gas such as air (shown by stippling in the figure) in a sealed manner. The upper gas chamber 19 is open to the atmosphere through an open vent passage 4b provided in the thigh portion 4.

Moreover, the basic configuration of the motion transmission means 34 is the same as that of the first embodiment, and is configured by connecting the piston 18 and the rotating shaft portion 11 of the knee joint 8 by the use of the piston rod 21 and the first and second link arms 22 and 23. However, in this embodiment, the motion transmission means 34 (specifically, lengths and posture of the first and second link arms 22 and 23, relative to the moved position of the piston 18) is configured as follows: when the leg 3 performs bending motion at the knee joint 8 from the stretched state of the leg 3, the piston 18 moves in a direction to compress the gas in the gas chamber 20 (downward in the figure) until the knee bending angle θ reaches a predetermined angle; and, once the knee bending angle θ exceeds the predetermined angle, the piston 18 moves in the opposite direction (upward in the figure) to the above direction. In other words, the motion transmission means 34 is configured so that the piston 18 reaches a so-called bottom dead center at the above-mentioned predetermined angle. In this case, the predetermined angle stated above is set to be the same as the piston top dead center angle θx described in the foregoing first embodiment The configurations other than the above-described configuration are exactly the same as those of the foregoing first embodiment. Further, control processing by the control unit 26 is the same as that in the forgoing first embodiment.

In the assist device 32 of this embodiment, the characteristics of changes of the auxiliary knee rotation force relative to the knee bending angle θ are the same as those in the foregoing first embodiment (see FIG. 4). The auxiliary knee rotation force is generated from the spring means 33 due to an elastic force of the gas within the gas chamber 20. Therefore, the magnitude (absolute value) of the auxiliary knee rotation force of the spring means 33 becomes the largest at the foregoing maximum auxiliary force angle θy and the maximum auxiliary force angle θy'. The maximum auxiliary force angle θy is slightly larger than the foregoing supporting leg period maximum knee bending angle θa (see FIG. 5) in running motion of the robot 1 described in the foregoing first embodiment and slightly smaller than the piston bottom dead center angle θx. The maximum auxiliary force angle θy' is slightly larger than the piston bottom dead center angle θx. Thus, an effect of action similar to that of the foregoing first embodiment can be achieved.

Next, a third embodiment of the present invention is described with reference to FIG. 9. Note that this embodiment is different from the foregoing first embodiment only in a part of the configuration of the assist device. Thus, reference numerals and figures same as those in the first embodiment are used for the same constituents as those of the first embodiment, and description thereof is omitted.

Figure 9:
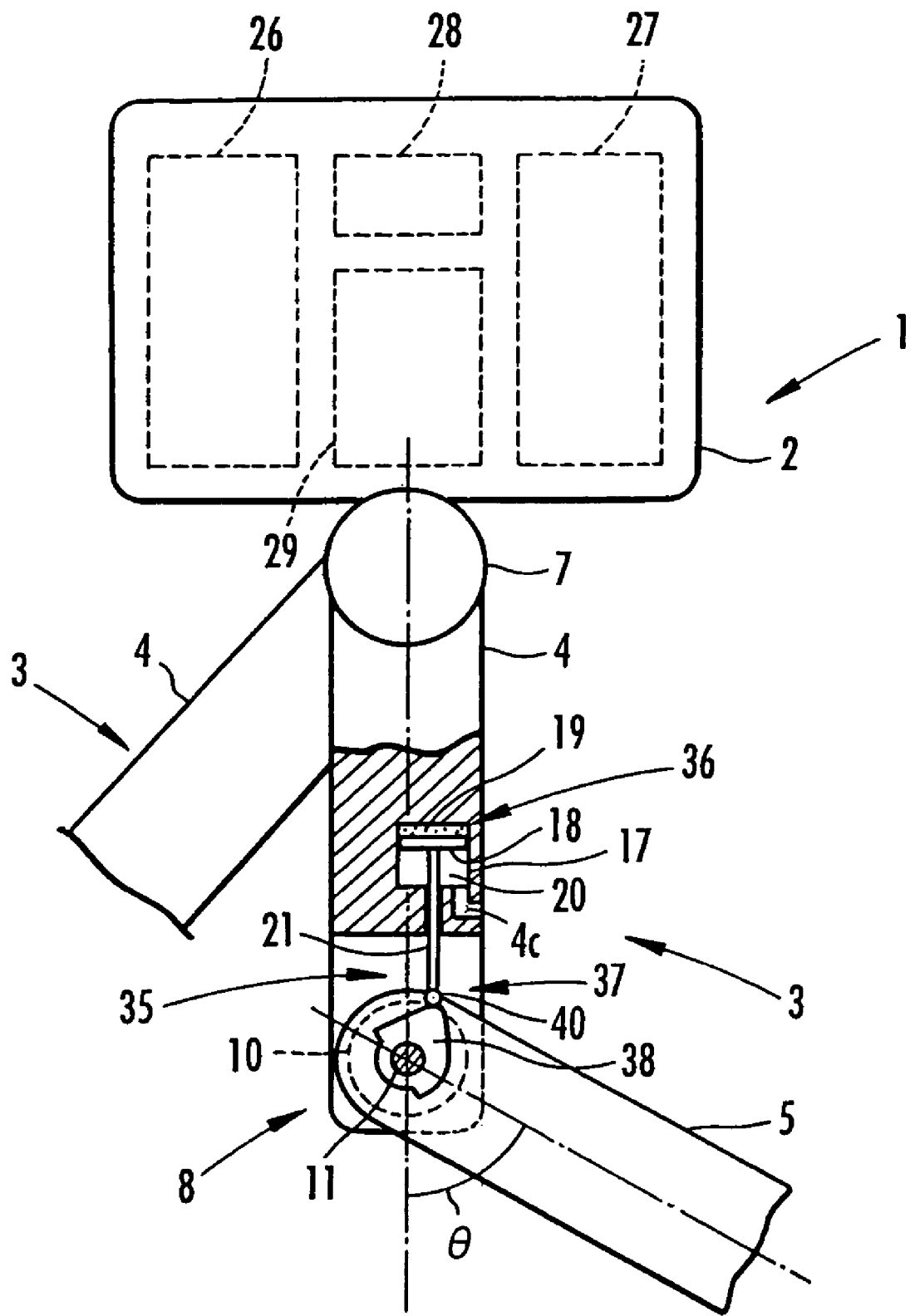
FIG. 9 is an explanatory view showing the configuration of an assist device in a third embodiment of the present invention.

Referring to FIG. 9, an assist device 35 of this embodiment is configured by spring means 36, which is a gas spring, and motion transmission means 37 for transmitting knee bending/stretching motion to the spring means 36. In this case, the basic configuration of the spring means 36 is the same as that of the spring means 15 of the foregoing first embodiment, and includes the cylinder 17 and the piston 18. The gas chamber 19 above the piston 18 is filled with gas in a sealed manner. Note that, in this embodiment, the cylinder 17 is positioned within the thigh portion 4 so that the axis of the cylinder 17 (axis of the piston 18) comes at a position spaced from the rotating shaft portion 11 of the knee joint 8 in a radial direction of the rotating shaft portion 11. In addition, the gas chamber 20 under the piston 18 is open to the atmosphere through an open vent passage 4c.

Furthermore, in this embodiment, the motion transmission means 37 (rotary motion to linear motion transforming means) is configured by a cam 38 rotatably attached to the rotating shaft portion 11 of the knee joint 8 to be integral with the rotating shaft portion 11, the piston rod 21 extending concentrically with the cylinder 17 and downward from the piston 18 through the gas chamber 20, and a roller 40 rotatably attached to the lower end portion of the piston rod 21. The roller 40 is in contact with the circumferential surface (cam surface) of the cam 38 in a free rolling manner. Therefore, as the cam 38 rotates with the rotating shaft portion 11 accompanied by knee bending/stretching motion, the piston rod 21 and the roller 40 move together with the piston 18 in the axis direction of the cylinder 17 along the shape of the circumferential surface (cam surface) of the cam 38.

In this case, the cam surface (circumferential surface) of the above-mentioned cam 38 is formed as follows: when the leg 3 performs bending motion at the knee joint 8 from the stretched state of the leg 3, the piston 18 moves in a direction to compress the gas within the gas chamber 19 (upward in the figure) until the knee bending angle $\theta$ reaches a predetermined angle smaller than the free leg period maximum knee bending angle $\theta b$ described in the foregoing first embodiment; and, once the knee bending angle $\theta$ exceeds the predetermined angle, the piston 18 moves in the opposite direction (downward in the figure) to the above-mentioned direction. In other words, the shape of the cam surface of the cam 38 is decided so that the piston 18 reaches the top dead center at the predetermined angle mentioned above (hereinafter, the above-mentioned predetermined angle is referred to as a piston top dead center angle, similar to the foregoing first embodiment). In this case, the cam surface of the cam 38 is also formed so that the characteristics of the auxiliary knee rotation force of the spring means 36 relative to the knee bending angle $\theta$ become almost the same, for example, as those of the foregoing first embodiment (see FIG. 4). Specifically, the piston top dead center angle in this embodiment is almost the same as the piston top dead center angle $\theta x$ in the foregoing first embodiment. In addition, the cam surface of the cam 38 is formed so that the magnitude (absolute value) of the auxiliary knee rotation force of the spring means 36 becomes the largest (maximum) at an angle (almost the same as $\theta y$ in FIG. 4) smaller than the piston top dead center angle $\theta x$ and slightly larger than the foregoing supporting leg period maximum knee bending angle $\theta a$ in running motion of the robot 1, and at an angle (almost the same as $\theta y'$ in FIG. 4) slightly larger than the piston top dead center angle $\theta x$. The configurations apart from the above-described configuration, as well as control processing by the control unit 26, are the same as those of the foregoing first embodiment.

In the assist device 35 of this embodiment, the characteristics of changes of the auxiliary knee rotation force generated from the spring means 36 are similar to those in the foregoing first embodiment. Thus, an effect of action similar to that in the foregoing first embodiment can be achieved.

Next, a fourth embodiment of the present invention is described with reference to FIGS. 10 and 11. Note that this embodiment is different from the above-described third embodiment only in a part of the configuration of the assist device. Thus, reference numerals and figures same as those in the third embodiment are used for the same constituents as those of the third embodiment, and description thereof is omitted.

Figure 10:
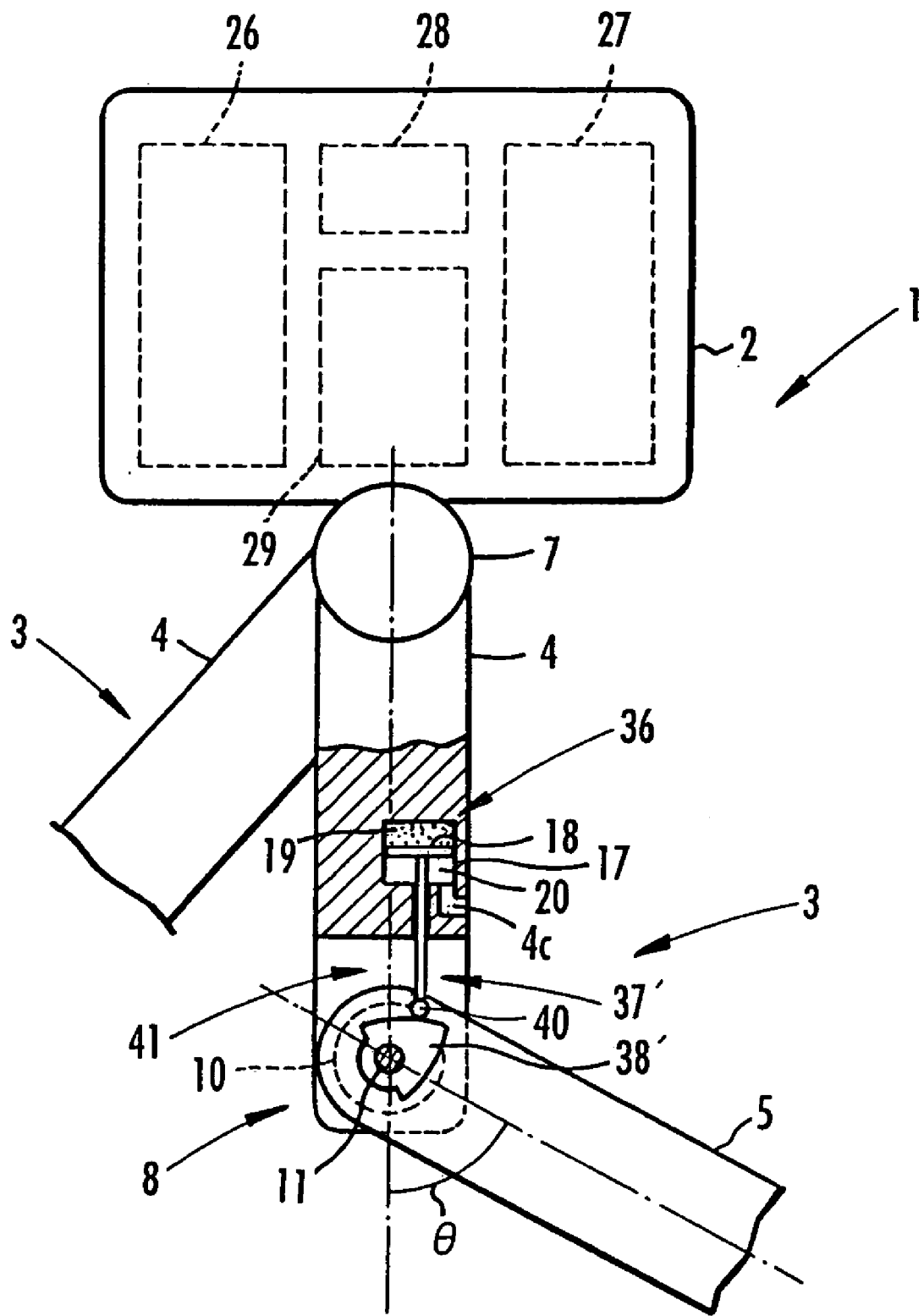
FIG. 10 is an explanatory view showing the configuration of an assist device in a fourth embodiment of the present invention.

Referring to FIG. 10, the basic configuration of an assist device 41 of this embodiment is the same as that of the aforementioned third embodiment. The assist device 41 includes the spring means 36 having the same configuration as that of the third embodiment, and motion transmission means 37' (rotary motion to linear motion transforming means) for transmitting knee bending/stretching motion to the spring means 36 through a cam 38'. However, in this case, in the motion transmission means 37' of the assist device 41 of this embodiment, the cam surface of the cam 38' is formed so that a piston top dead center angle $\theta x1$ (see FIG. 11), which is a knee bending angle $\theta$ at which the piston 18 reaches the top dead center, is larger than that of the forgoing third embodiment and close to the foregoing free leg period maximum knee bending angle $\theta b$ in, for example, running motion of the robot 1.

Figure 11:
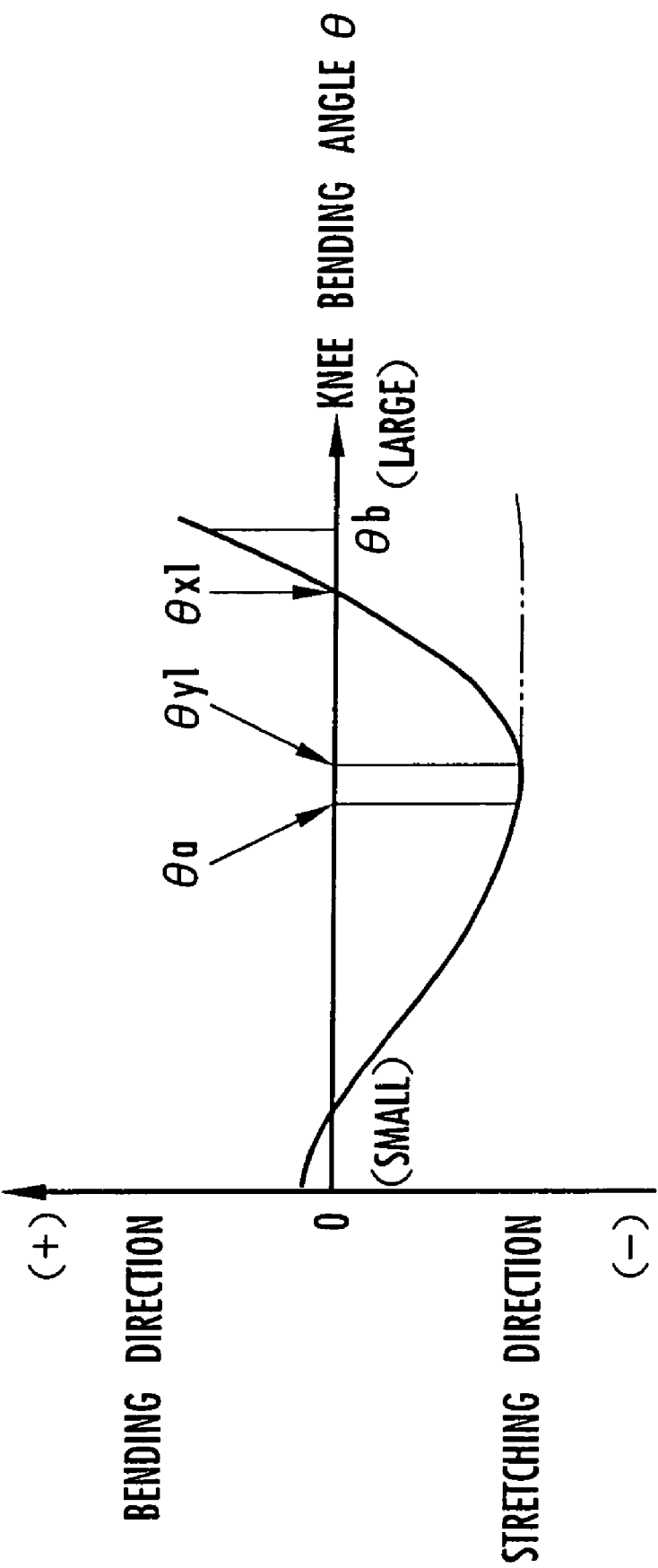
FIG. 11 is a diagram showing the characteristics of spring means of the assist device in FIG. 10.

In this case, as shown by a solid line in FIG. 11, the cam surface of the cam 38' is formed so that the auxiliary knee rotation force of the spring means 36 becomes the largest (maximum) in the stretching direction of the leg 3 at a predetermined angle $\theta y1$ which is smaller than the piston top dead center angle $\theta x1$ at which the auxiliary knee rotation force of the spring means 36 becomes "0", and slightly larger than the foregoing supporting leg period maximum knee bending angle $\theta a$. In other words, the cam surface of the cam 38' is formed as follows: when the knee bending angle $\theta$ is smaller than the aforementioned predetermined angle $\theta y1$ (hereinafter, referred to as a maximum auxiliary force angle $\theta y1$), the auxiliary knee rotation force of the spring means 36 increases in the stretching direction of the leg 3 as the knee bending angle $\theta$ increases; and, when the knee bending angle $\theta$ is larger than the maximum auxiliary force angle $\theta y1$, the auxiliary knee rotation force in the stretching direction of the leg 3 decreases as the knee bending angle $\theta$ increases. This kind of characteristics of the auxiliary knee rotation force are realized by forming the cam surface so that, for example, the radius (a distance from the axis of the rotating shaft portion 11 of the knee joint 8) to a point where the cam surface of the cam 38' contacts the aforementioned roller 40 changes relative to the knee bending angle $\theta$ less acutely than the case of the foregoing third embodiment. Note that, in this embodiment, once the knee bending angle $\theta$ exceeds the piston top dead center angle $\theta x1$, the auxiliary knee rotation force of the spring means 36 increases in the bending direction of the leg 3. However, the magnitude (absolute value) of the auxiliary knee rotation force at the foregoing free leg period maximum knee bending angle $\theta b$ is set to be smaller than the magnitude (absolute value) of the auxiliary knee rotation force at the aforementioned maximum auxiliary force angle $\theta y1$.

In this embodiment, similar to the assist device 14 of the foregoing first embodiment, the magnitude (absolute value) of the auxiliary knee rotation force of the spring means 36 becomes the largest at the knee bending angle $\theta$ ($=\theta y1$) slightly larger than the supporting leg period maximum knee bending angle $\theta a$ in running motion of the robot 1. Therefore, an effect of action similar to that of the first embodiment can be achieved. In this case, in particular, the auxiliary knee rotation force smoothly changes relative to the knee bending angle $\theta$. Thus, it is possible to avoid a sudden change in the auxiliary knee rotation force and thus a sudden change in the driving force of the knee joint electric motor 10.

Note that, the following is also feasible regarding the above-described fourth embodiment. In a case where the piston top dead center angle $\theta x1$ is set larger (for example, larger than the free leg period maximum knee bending angle $\theta b$), the auxiliary knee rotation force of the spring means 36 does not change in the bending direction of the leg 3 as long as a knee bending angle $\theta$ is smaller than the free leg period maximum knee bending angle $\theta b$, even though the knee bending angle $\theta$ exceeds the maximum auxiliary force angle $\theta y1$.

Furthermore, in the case where the piston top dead center angle $\theta x1$ is set even larger, the cam surface of the cam 38' is formed so that the radius at the point where the cam surface of the cam 38' contacts the aforementioned roller 40 changes less acutely than the case of the foregoing fourth embodiment, relative to the knee bending angle θ. Thus, the auxiliary knee rotation force of the spring means 36 can be kept almost invariant (the auxiliary knee rotation force is maintained almost equal to the value of the auxiliary knee rotation force at the maximum auxiliary force angle θy1) when the knee bending angle θ exceeds the maximum auxiliary force angle θy1 as shown by an imaginary line in FIG. 11.

According to the characteristics of the auxiliary knee rotation force of the spring means 36, during the free leg period of each leg 3 in running motion of the robot 1, the auxiliary knee rotation force of the spring means 36 becomes almost invariant once the knee bending angle θ exceeds the maximum auxiliary force angle θy1. Therefore, the burden on the knee joint electric motor 10 becomes larger than that in the case of the foregoing third embodiment. However, there is no further increase in the auxiliary knee rotation force of the spring means 36 when the knee bending angle θ is larger than the maximum auxiliary force angle θy1. Thus, the auxiliary knee rotation force is not excessively large relative to the required knee rotation force. As a result, the largest driving force (largest torque) to be generated to the knee joint electric motor 10 during the running motion of the robot 1 can be kept relatively low. Accordingly, the energy loss due to Joule heat or the like is suppressed, ensuring favorable utilization efficiency of energy.

Further, in the first to fourth embodiments described above, in the spring means 15, 33 and 36, the gas generating the elastic force fills only one of the gas chambers 19 and 20 within the cylinder 17 and sealed therein. However, the gas may fill both gas chambers 19 and 20 and sealed therein. In this case, the pressure of the gas filling the gas chambers 19 and 20 are set to be relatively high, thus increasing the auxiliary knee rotation force generated from the spring means.

Moreover, in the foregoing third and fourth embodiments, the cylinder 17 may be arranged at a position where the axis of the cylinder 17 intersects with the axis of the rotating shaft portion 11 of the knee joint 8, similar to the case of the foregoing first embodiment.

Furthermore, in the foregoing first to fourth embodiments, the spring means 15, 33 and 36 are accommodated in the thigh portion 4. However, the spring means may be provided outside of the thigh portion 4 (outside of the leg 3). Alternatively, the spring means may be accommodated in the crus portion 5.

Next, a fifth embodiment of the present invention is described with reference to FIGS. 12 and 13. Note that this embodiment is different from the foregoing first embodiment only in a part of the configuration of the assist device and a part of processing by the control unit. Thus, reference numerals and figures same as those in the first embodiment are used for the same constituents as those of the first embodiment, and description thereof is omitted.

Figure 12:
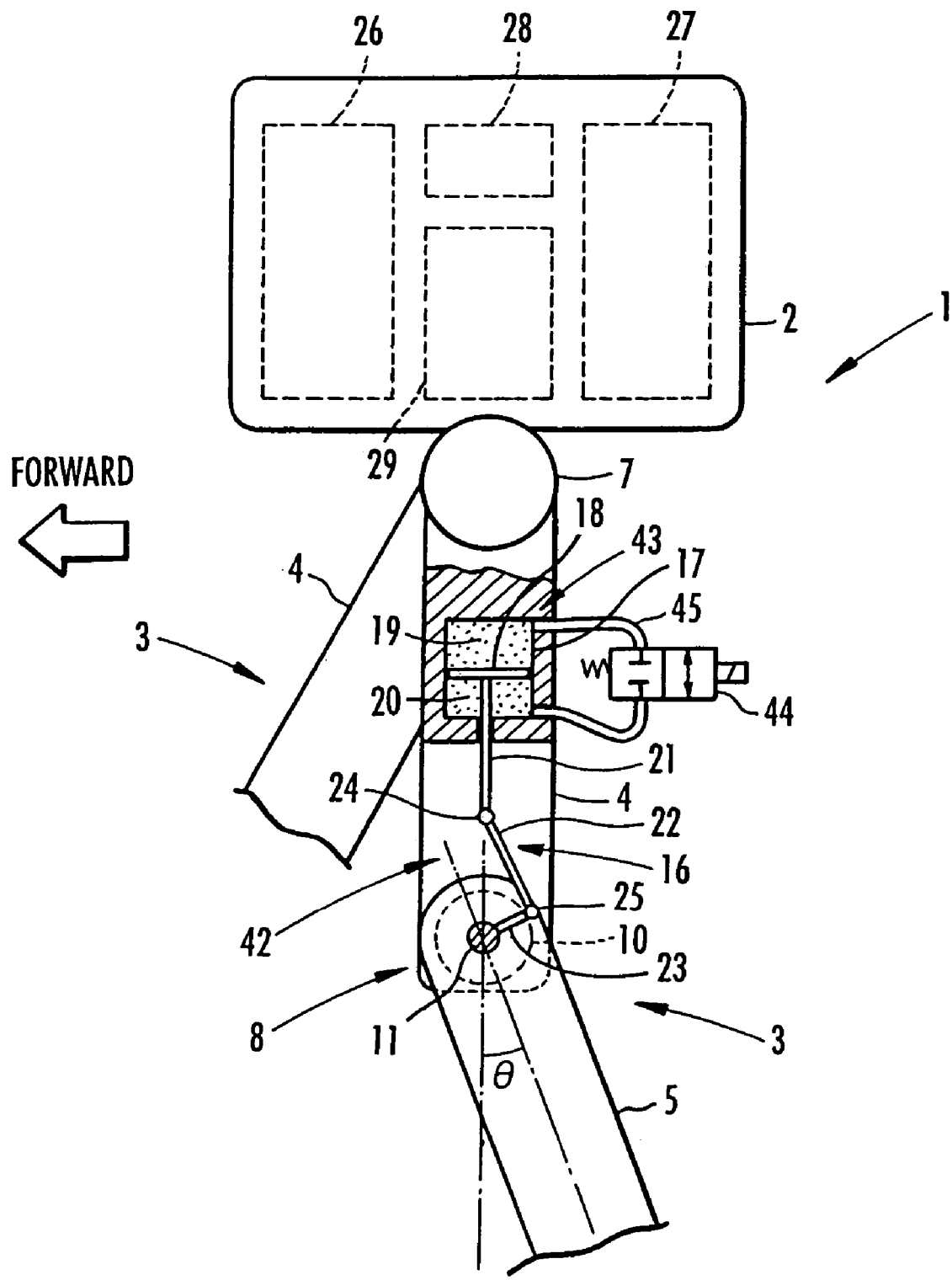
FIG. 12 is an explanatory view showing the configuration of an assist device in a fifth embodiment of the present invention.

Referring to FIG. 12, an assist device 42 of this embodiment is configured by spring means 43, which is a gas spring, and motion transmission means 16 (rotary motion to linear motion transforming means) for transmitting knee bending/stretching motion to the spring means 43. In this case, the basic configuration of the spring means 43 is the same as that of the spring means 15 of the foregoing first embodiment, and the spring means 43 includes the cylinder 17 and the piston 18. However, in this embodiment, pressurized gas fills both gas chambers 19 and 20 within the cylinder 17 and sealed therein. In addition, the gas chambers 19 and 20 are connected to each other through a vent passage 45 having an openable/closable electromagnetic switch valve 44. Note that the configuration of the motion transmission means 16 is the same as that in the foregoing first embodiment. Further, in FIG. 12, the electromagnetic switch valve 44 and the vent passage 45 are provided outside of the leg 3, but may be accommodated within the leg 3. Furthermore, the electromagnetic switch valve 44 and the vent passage 45 are equivalent to valve means and a flow passage of the present invention, respectively.

In the assist device 42 configured as above, when the electromagnetic valve 44 is in a closed state, the piston 18 moves in exactly the same manner as the foregoing first embodiment, in accordance with knee bending/stretching motion of the leg 3. Thus, the spring means 43 generates the auxiliary knee rotation force by the elastic force of the gas within the gas chambers 19 and 20. In addition, the characteristics of changes of the auxiliary knee rotation force relative to the knee bending angle θ in this case are similar to those of the foregoing first embodiment (see FIG. 4) (however, the magnitude of the auxiliary knee rotation force generated at each knee bending angle θ is generally different from that in the foregoing first embodiment, depending on, for example, pressure of the gas within the gas chambers 19 and 20). Meanwhile, when the electromagnetic valve 44 is in an opened state, the piston 18 moves in accordance with knee bending/stretching motion of the leg 3. However, since the gas within the above-mentioned gas chambers 19 and 20 flows into each other, no compression or expansion of the gas occurs. Thus, knee bending/stretching motion of the leg 3 is not transmitted to the gas of the spring means 43, and thus the spring means 43 generates almost no elastic force. Accordingly, the auxiliary knee rotation force of the spring means 43 in the opened state of the electromagnetic valve 44 is almost "0" regardless of the knee bending angle θ.

Figure 13:
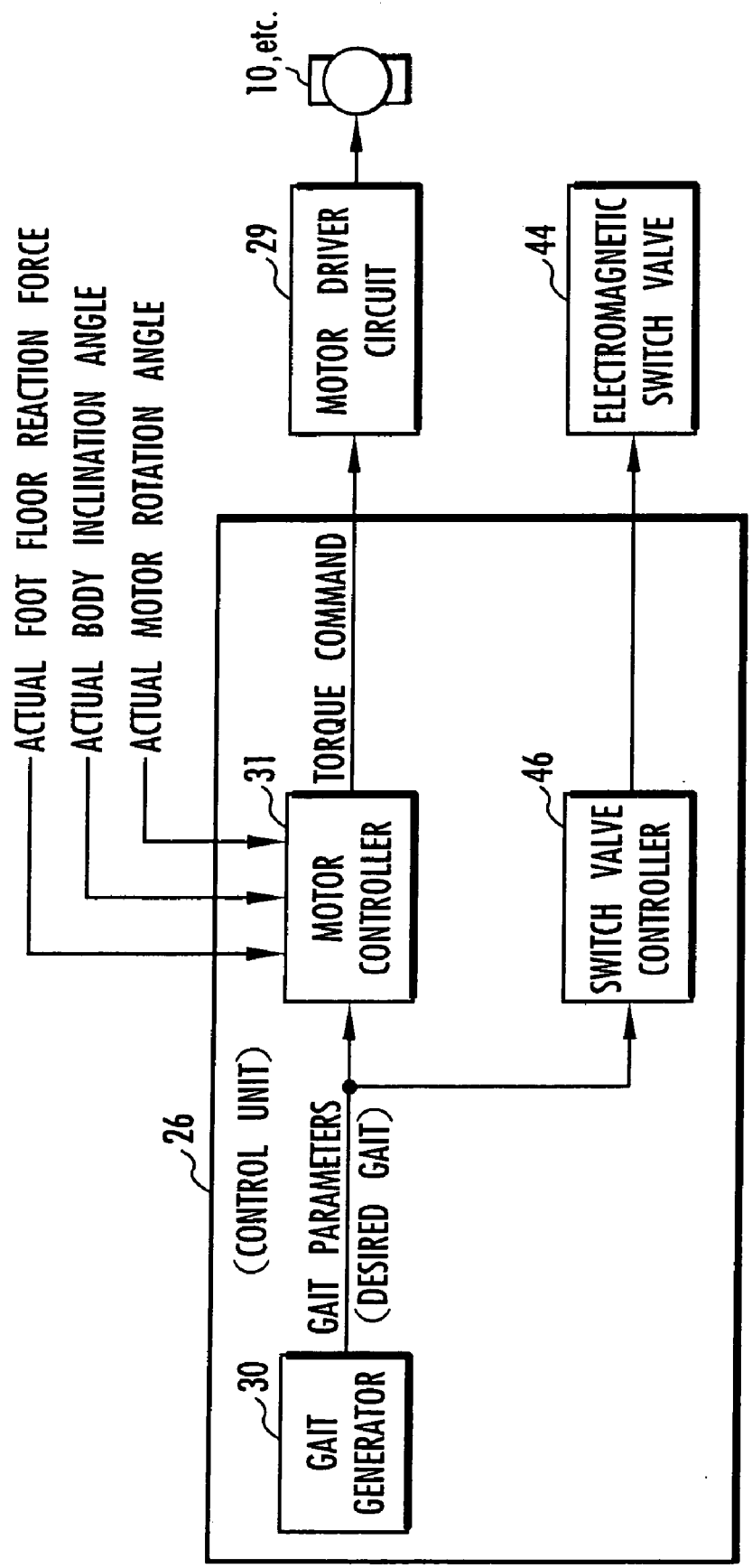
FIG. 13 is a block diagram showing the functional configuration of a control unit in the fifth embodiment.

Moreover, referring to FIG. 13, the control unit 26 in this embodiment includes the gait generator 30 and the motor controller 31 similar to the control unit 26 in the foregoing first embodiment. In addition, the control unit 26 includes a switch valve controller 46 serving as functional means for controlling open and close of the aforementioned electromagnetic switch valve 44. The switch valve controller 46 controls the electromagnetic switch valve 44 to be in the opened state when the desired gait (to be specific, the gait parameters defining the desired gait) generated by the above-mentioned gait generator 30 during the running motion of the robot 1 is a gait other than that of above-mentioned running motion of the robot 1 (for example, a gait of a normal walking of the robot 1). When the desired gait is a gait of above-mentioned running motion of the robot 1 (running motion in a similar form to that of the normal running gait of a human), the switch valve controller 46 sequentially determines whether the current time is within the supporting leg period or the free leg period of the leg 3 for each control cycle of the control unit 26, based on the desired gait. When the current time is within the supporting leg period, the switch valve controller 46 controls the electromagnetic valve 44 to be in the closed state. When the current time is within the free leg period of the leg 3, the switch valve controller 46 controls the electromagnetic valve 44 to be in the opened state. Note that the switch valve controller 46 of the control unit 26 is equivalent to the control means in the present invention.

Figure 7:
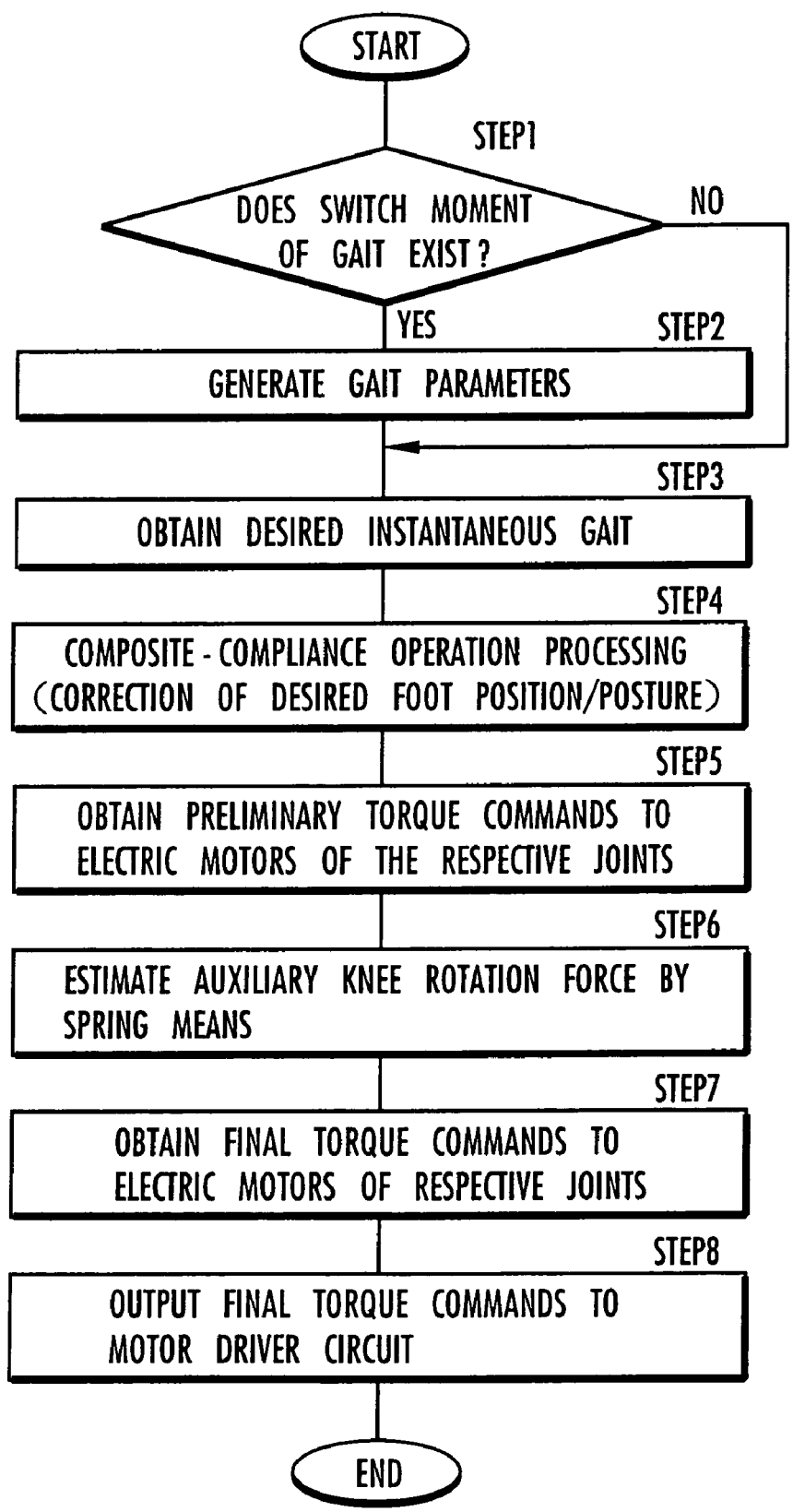
FIG. 7 is a flowchart showing processing by the control unit in FIG. 6.

The configurations and the control processing by the control unit 26 other than those described above are the same as those in the foregoing first embodiment. However, in this case, the auxiliary knee rotation force of the spring means 43 is almost "0" when the electromagnetic switch valve 44 is in the opened state, as mentioned above. Therefore, the auxiliary knee rotation force estimated by the control unit 26 in the foregoing STEP 6 in FIG. 7 is "0" during the free leg period of the leg 3 when the electromagnetic switch valve 44 is set in the opened state. Hence, in this case, the preliminary torque commands to the electric motors of the respective joints 7 to 9, obtained in STEP 5 in FIG. 7, becomes the final torque commands decided in STEP 7 in FIG. 7, without any changes.

In the assist device 42 of this embodiment, the auxiliary knee rotation force of the spring means 43 is generated similar to the foregoing first embodiment during the supporting leg period of each leg 3 in running motion of the robot 1 with the gait similar to the normal running gait of a human. Thus, the effect of action in the supporting leg period is similar to that of the foregoing first embodiment. Specifically, the driving force (torque) to be generated to the knee joint electric motor 10 during the supporting leg period of each leg 3 can be relatively small, thus reducing the burden on the knee joint electric motor 10.

Meanwhile, the auxiliary knee rotation force of the spring means 43 is not generated during the free leg period of each leg 3 in running motion of the robot 1. However, the required knee rotation force during the free leg period is originally small. Thus, basically, the driving force generated to the knee joint electric motor 10 is smaller than those in the cases of the foregoing first to fourth embodiments. Therefore, the driving force generated to the knee joint electric motor 10 can be small over the entire period of the running motion of the robot 1. Moreover, the auxiliary knee rotation force of the spring means 43 is not generated during the free leg period in running motion of the robot 1. Thus, the largest value (maximum value) of the auxiliary knee rotation force (the auxiliary knee rotation force in the stretching direction of the leg 3) of the spring means 43 during the supporting leg period can be set large. As a result, the burden on the knee joint electric motor 10 during the supporting leg period can be minimized. Consequently, the driving force generated to the knee joint electric motor 10 can be kept as small as possible over the entire period of running motion. Thus, utilization efficiency of energy of the robot 1 can be further improved and the knee joint electric motor 10 can be miniaturized.

Figure 14:
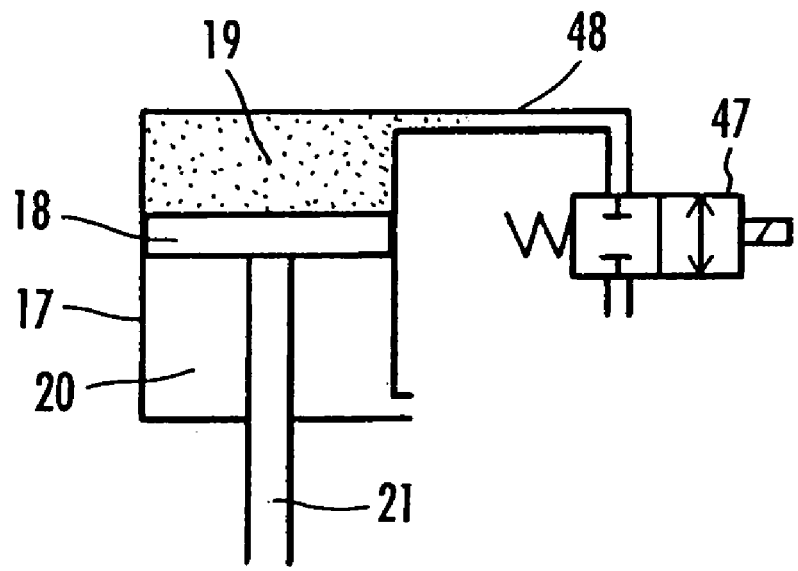
FIGS. 14(a) and 14(b) are explanatory views of modified aspects related to the fifth embodiment.
Figure 14:
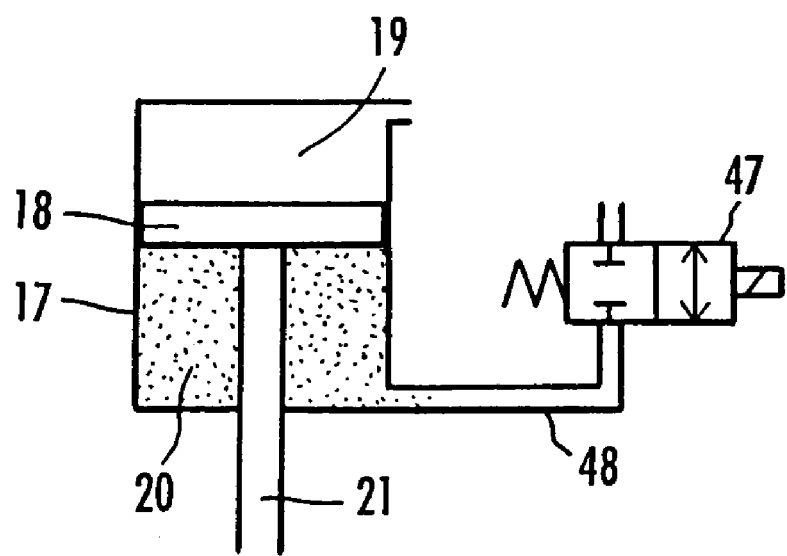

Note that, in the aforementioned fifth embodiment, the gas fills both of the gas chambers 19 and 20 of the cylinder 17 and sealed therein. However, as described in the foregoing first to fourth embodiments, the gas may fill one of the gas chambers 19 and 20 in a sealed manner, and the other gas chamber may be open to the atmosphere. In this case, in order not to generate the auxiliary knee rotation force of the spring means during the free leg period or the like of each leg 3 as described in the aforementioned fifth embodiment, the gas chamber 19 may be open to the atmosphere through an vent passage 48 having a re-closable electromagnetic switch valve 47 as shown in FIG. 14(*a*), in a case where the gas fills the gas chamber 19 within the cylinder 17 and sealed therein like, for example, the foregoing first, third and fourth embodiments. On the other hand, in a case where the gas fills the gas chamber 20 and sealed therein like the foregoing second embodiment, the gas chamber 20 may be open to the atmosphere through the vent passage 48 having the re-closable electromagnetic switch valve 47 as shown in FIG. 14(*b*). Opening and closing of these electromagnetic switch valves 47 are controlled similar to the foregoing fifth embodiment.

Moreover, in the fifth embodiment, the motion transmission means 16 has the same configuration as that of the first embodiment. However, the motion transmission means may be configured by the use of a cam, for example, like the foregoing third and fourth embodiments.

Furthermore, in the first to fifth embodiments described so far, the gas spring is used as the spring means. However, a solid spring like a coiled spring may be used. In this case, a coiled spring, which expands/contracts accompanied by the movement of the piston 18, may be accommodated in the gas chamber 19 above the piston 18 or the gas chamber 20 under the piston 18, in the assist device of one of the foregoing first to fourth embodiments. However, in general, a solid spring such as the coiled spring is likely to cause vibration. Thus, it is preferred to use the gas spring like the foregoing first to fifth embodiments in light of smooth behavior of the robot 1.

Yet further, in the first to fifth embodiments described above, description was given regarding the case where the knee joint 8 is the specific joint. However, the present invention can be applied to other joints 7 and 9. Moreover, the present invention can be applied not only to the biped mobile robot but also to a legged mobile robot having three legs or more.

INDUSTRIAL APPLICABILITY

As hitherto described, the present invention is useful since a leg joint assist device having a small configuration can reduce a burden on a joint actuator while a legged mobile robot such as a biped mobile robot is moving, thereby providing the legged mobile robot with a small energy loss.

The invention claimed is:

1. A leg joint assist device for a legged mobile robot having legs, each of the legs configured by connecting a plurality of link members from a body via a plurality of joints, comprising:

a spring means for generating an auxiliary driving force acting on a specific joint among the plurality of the joints with an elastic energy stored in accordance with relative displacement motion between a pair of link members connected by the specific joint, together with a driving force of a joint actuator that drive the specific joint, wherein the spring means is provided so that, during the relative displacement motion between the pair of link members, the auxiliary driving force increases as a relative displacement amount between the pair of link members increases when the relative displacement amount is smaller than or equal to a predetermined displacement amount, and so that the auxiliary driving force becomes smaller than or almost equal to the auxiliary driving force obtained at the predetermined displacement amount after the relative displacement amount exceeds the predetermined displacement amount, wherein the relative displacement motion between the pair of link members comprises bending/stretching motion at the specific joint, and the relative displacement amount comprises a bending angle between the pair of link members, and wherein a value of the bending angle increases as a magnitude of bending of the pair of link members increases, and wherein the predetermined displacement amount is set to an angle smaller than the bending angle between the pair of link members at a largest bending decree in a foot lifted state of each of the legs while the legged mobile robot is moved on an almost flat floor with a certain gait.

2. The leg joint assist device for a legged mobile robot according to claim 1, wherein the predetermined displacement amount is set to an angle close to the bending angle between the pair of link members at the largest bending degree in a foot landing state of each of the legs while the legged mobile robot is moved on the almost flat floor with the certain gait.

3. The leg joint assist device for a legged mobile robot according to claim 1, wherein the specific joint comprises a joint between a joint at a proximal end of each of the legs and a joint at a distal end of each of the legs.

4. The leg joint assist device for a legged mobile robot according to claim 1, wherein the legged mobile robot comprises a biped mobile robot having two legs, each configured by sequentially connecting a thigh portion, a crus portion and a foot portion serving as the link members, through a hip joint, a knee joint and an ankle joint, from the body, and the specific joint comprises the knee joint bendably and stretchably connecting the thigh portion and the crus portion serving as the pair of link members.

5. The leg joint assist device for a legged mobile robot according to claim 1, wherein the spring means comprises a gas spring elastically generating the auxiliary driving force by compression or expansion of gas.

6. The leg joint assist device for a legged mobile robot according to claim 1, wherein the spring means comprises a gas spring comprising: a cylinder; a piston disposed within the cylinder so as to be able to slide synchronously with bending/stretching motion between the pair of link members; a gas chamber formed within the cylinder and having a volume that changes as the piston slides; and gas filling the gas chamber, wherein the auxiliary driving force is generated elastically by compression or expansion of the gas within the gas chamber accompanied by changes in volume of the gas chamber.

7. The leg joint assist device for a legged mobile robot according to claim 6, comprising: a flow passage connected to the gas chamber for allowing the gas within the gas chamber to flow to an outside of the gas chamber in order to inhibit compression or expansion within the gas chamber accompanied by changes in the volume of the gas chamber; valve means for opening and closing the flow passage; and control means for opening the valve means in a foot lifted state of each of the legs and for closing the valve means in a foot landing state of each of the legs.

8. A leg joint assist device for a legged mobile robot having legs, each of the legs configured by connecting a plurality of link members from a body via a plurality of joints, comprising:

a spring means for generating an auxiliary driving force acting on a specific joint among the plurality of the joints with an elastic energy stored in accordance with relative displacement motion between a pair of link members connected by the specific joint, together with a driving force of a joint actuator that drive the specific joint, wherein the spring means is provided so that, during the relative displacement motion between the pair of link members, the auxiliary driving force increases as a relative displacement amount between the pair of link members increases when the relative displacement amount is smaller than or equal to a predetermined displacement amount, and so that the auxiliary driving force becomes smaller than or almost equal to the auxiliary driving force obtained at the predetermined displacement amount after the relative displacement amount exceeds the predetermined displacement amount, wherein the relative displacement motion between the pair of link members comprises bending/stretching motion at the specific joint, and the relative displacement amount comprises a bending angle between the pair of link members, and wherein a value of the bending angle increases as a magnitude of bending of the pair of link members increases, and wherein the spring means is provided so that the auxiliary driving force increases/decreases by linear reciprocating motion of an engagement member engaged with the spring means, the assist device comprises rotary motion to linear motion transforming means for transforming rotary motion of a rotating shaft of the specific joint, the rotary motion generating the bending/stretching motion between the pair of link members, into straight reciprocating motion and transmitting the straight reciprocating motion to the engagement member, and the rotary motion to linear motion transforming means is configured to move the engagement member directionally outwards to increase the auxiliary driving force of the spring means as the bending angle between the pair of link members increases, at least until the bending angle between the pair of link members is increased to an angle equivalent to the predetermined displacement amount, and to move the engagement member directionally inwards to decrease the auxiliary driving force of the spring means, after the bending angle between the pair of link members exceeds the angle equivalent to the predetermined displacement amount.

9. A leg joint assist device for a legged mobile robot having legs, each of the legs configured by connecting a plurality of link members from a body via a plurality of joints, comprising:

a spring means for generating an auxiliary driving force acting on a specific joint among the plurality of the joints with an elastic energy stored in accordance with relative displacement motion between a pair of link members connected by the specific joint, together with a driving force of a joint actuator that drive the specific joint, wherein the spring means is provided so that, during the relative displacement motion between the pair of link members, the auxiliary driving force increases as a relative displacement amount between the pair of link members increases when the relative displacement amount is smaller than or equal to a predetermined displacement amount, and so that the auxiliary driving force becomes smaller than or almost equal to the auxiliary driving force obtained at the predetermined displacement amount after the relative displacement amount exceeds the predetermined displacement amount, wherein the relative displacement motion between the pair of link members comprises bending/stretching motion at the specific joint, and the relative displacement amount comprises a bending angle between the pair of link members, and wherein a value of the bending angle increases as a magnitude of bending of the pair of link members increases, wherein the spring means comprises a gas spring comprising: a cylinder; a piston disposed within the cylinder so as to be able to slide synchronously with bending/stretching motion between the pair of link members; a gas chamber formed within the cylinder and having a volume that changes as the piston slides: and gas filling the gas chamber, wherein the auxiliary driving force is generated elastically by compression or expansion of the gas within the gas chamber accompanied by changes in volume of the gas chamber, and further comprising rotary motion to linear motion transforming means, as means for sliding the piston synchronously with the bending/stretching motion between the pair of link members, for transforming rotary motion of a rotating shaft of the specific joint, the rotary motion generating the bending/stretching motion between the pair of link members, into straight reciprocating motion and transmitting the straight reciprocating motion to the piston, wherein the rotary motion to linear motion transforming means is configured to move the piston directionally outwards to increase the auxiliary driving force of the gas spring at least until the bending angle between the pair of link members is increased to an angle equivalent to the predetermined displacement amount, and to move the piston directionally inwards to decrease the auxiliary driving force of the gas spring, after the bending angle between the pair of link members exceeds the angle equivalent to the predetermined displacement amount.

10. The leg joint assist device for a legged mobile robot according to claim 1, wherein the specific joint comprises a joint between a joint at a proximal end of each of the legs and a joint at a distal end of each of the legs.

11. The leg joint assist device for a legged mobile robot according to claim 2, wherein the specific joint comprises a joint between a joint at a proximal end of each of the legs and a joint at a distal end of each of the legs.

12. The leg joint assist device for a legged mobile robot according to claim 1, wherein the legged mobile robot comprises a biped mobile robot having two legs, each configured by sequentially connecting a thigh portion, a crus portion and a foot portion serving as the link members, through a hip joint, a knee joint and an ankle joint, from the body, and the specific joint comprises the knee joint bendably and stretchably connecting the thigh portion and the crus portion serving as the pair of link members.

13. The leg joint assist device for a legged mobile robot according to claim 2, wherein the legged mobile robot comprises a biped mobile robot having two legs, each configured by sequentially connecting a thigh portion, a crus portion and a foot portion serving as the link members, through a hip joint, a knee joint and an ankle joint, from the body, and the specific joint comprises the knee joint bendably and stretchably connecting the thigh portion and the crus portion serving as the pair of link members.

* * * * *